United States Patent
Yang et al.

(10) Patent No.: US 12,259,240 B1
(45) Date of Patent: Mar. 25, 2025

(54) DISTANCE MEASUREMENT DEVICE AND METHOD BASED ON SECONDARY MIXING OF INTER-MODE SELF-INTERFERENCE SIGNALS OF OPTICAL FREQUENCY COMBS

(71) Applicant: Harbin Institute of Technology, Harbin (CN)

(72) Inventors: Ruitao Yang, Harbin (CN); Hao Sun, Harbin (CN); Pengcheng Hu, Harbin (CN)

(73) Assignee: Harbin Institute of Technology, Harbin (CN)

( * ) Notice: Subject to any disclaimer, the term of this patent is extended or adjusted under 35 U.S.C. 154(b) by 0 days.

(21) Appl. No.: 18/663,403

(22) Filed: May 14, 2024

(30) Foreign Application Priority Data

Dec. 20, 2023 (CN) .......................... 202311761113.9

(51) Int. Cl.
  *G01B 9/02001* (2022.01)
  *G01B 9/02* (2022.01)
  (Continued)

(52) U.S. Cl.
  CPC ..... *G01B 9/02008* (2013.01); *G01B 9/02003* (2013.01); *G01B 9/02048* (2013.01); *G01B 11/02* (2013.01); *G01B 2290/70* (2013.01)

(58) Field of Classification Search
  CPC ............ G01B 9/02003; G01B 9/02008; G01B 9/02048; G01B 2290/70
  See application file for complete search history.

(56) References Cited

U.S. PATENT DOCUMENTS

| | | | | |
|---|---|---|---|---|
| 2001/0045513 | A1* | 11/2001 | Kourogi | G01B 9/02002 250/250 |
| 2007/0024860 | A1* | 2/2007 | Tobiason | G01B 9/02081 356/498 |

(Continued)

FOREIGN PATENT DOCUMENTS

CN        115267805 A        11/2022

OTHER PUBLICATIONS

CNIPA, Notification of First Office Action for CN202311761113.9, Jul. 23, 2024.

(Continued)

*Primary Examiner* — Michael A Lyons
(74) *Attorney, Agent, or Firm* — Hemisphere Law, PLLC; Zhigang Ma

(57) ABSTRACT

A distance measurement device and method based on secondary mixing of inter-mode self-interference signals of optical frequency combs are provided, which relate to the field of high precision laser distance measurement technologies. A dual-comb light source emits a dual-comb laser into a detection optical module to obtain the inter-mode self-interference signals carrying the to-be-measured distance information. The detection optical module outputs the inter-mode self-interference signals into a generation, acquisition and calculation module of inter-mode self-interference secondary mixing signals to generate the inter-mode self-interference secondary mixing signals, to thereby achieve signal acquisition and obtain a distance measurement result. In this device, coarse and fine distance measurements at different scales are achieved, measurement range and accuracy can be effectively balanced by combing intermediate transition measurement scales and inter-stage transition method, strong real-time property of measurement is (Continued)

achieved, and the light source has low cost and the scale of the system is small.

7 Claims, 2 Drawing Sheets

(51) Int. Cl.
   *G01B 9/02003* (2022.01)
   *G01B 11/02* (2006.01)

(56) References Cited

U.S. PATENT DOCUMENTS

2019/0391016 A1* 12/2019 Bourbeau Hébert ........................ G01B 9/02008
2023/0194683 A1* 6/2023 Jensen ................. G01B 5/0014 356/5.09

OTHER PUBLICATIONS

Harbin Institute of Technology (Applicant), Replacement claims (allowed) of CN202311761113.9, Aug. 21, 2024.
CNIPA, Notification to grant patent right for invention in CN202311761113.9, Aug. 30, 2024.

* cited by examiner

DISTANCE MEASUREMENT DEVICE AND METHOD BASED ON SECONDARY MIXING OF INTER-MODE SELF-INTERFERENCE SIGNALS OF OPTICAL FREQUENCY COMBS

CROSS-REFERENCE TO RELATED APPLICATION

This application claims priority to Chinese Patent Application No. 202311761113.9, filed Dec. 20, 2023, which is herein incorporated by reference in its entirety.

TECHNICAL FIELD

The disclosure relates to the field of high precision laser distance measurement technologies, and more particularly to a distance measurement device and method based on secondary mixing of inter-mode self-interference signals of optical frequency combs.

BACKGROUND

An inter-mode self-interference distance measurement technology is proposed by Kaoru Minoshima, et al. (Kaoru Minoshima, et al., High-accuracy measurement of 240-m distance in an optical tunnel by use of a compact femtosecond laser, Applied Optics, 2000, 39 (30): 5512). The inter-mode self-interference distance measurement technology synchronously generates a group of inter-mode self-interference signals with an optical frequency comb. The equivalent wavelengths of the different inter-mode self-interference signals serve as the measurement scales of different lengths. The self-interference signals between adjacent comb modes (i.e. the repetition rate signal) has the largest equivalent measurement wavelength and measurement range (a half of the measurement wavelength). And the inter-mode self-interference signal with the highest frequency detectable for the photodetector has the smallest equivalent measurement wavelength but the highest measurement accuracy. Through the synchronous generation of many measurement scales with different equivalent wavelengths, the inter-mode self-interference distance measurement technology has advantages of large measurement range, high measurement precision, and high measurement speed within a certain range, and has a good application prospect.

However, when using a single optical frequency comb for inter-mode self-interference distance measurement, the frequency difference (i.e., repetition rate) between adjacent modes of a commonly used optical frequency comb is usually larger than 1 megahertz (MHz), and a maximum measurement range corresponding to the inter-mode self-interference distance measurement is only a few hundred meters. In order to further expand the measurement range, an optical frequency comb with lower repetition rate can be selected to generate an inter-mode self-interference signal with a larger measurement scale. However, the inter-mode self-interference of the optical frequency comb with the lower repetition rate is difficult to generate a high-frequency measurement scale signal with high quality for the fine distance measurement, and the additional phase noise makes it difficult to maintain the original measurement accuracy while improving the measurement range. Therefore, how to ensure the original measurement accuracy while obtain a measurement scale with larger wavelength is a main problem to further improve the measurement range of the inter-mode self-interference currently.

Aiming at the above problem, at present, there are two main technical solutions all over the world, one is an inter-mode self-interference distance measurement method based on single optical frequency comb repetition rate scanning, and the other is a multi-wavelength inter-mode mutual-interference distance measurement method based on coherent dual optical frequency combs.

The inter-mode self-interference distance measurement method based on single optical frequency comb repetition rate scanning is proposed by Yoon-Soo Jang et al. (Yoon-Soo Jang et al., Absolute distance measurement with extension of non-ambiguity range using the frequency comb of a femtosecond laser, Optical Engineering, May 2014, 53 (12): 122403) This method scans a repetition rate of a single optical frequency comb, so that different measurement scales with different lengths are generated by the inter-mode self-interference signals. The multiple measurement scales with different repetition rates are further combined to obtain a lager combined wavelength to improve the measurement range. In this method, through repetition rate scanning, a maximum measurement scale generated by the inter-mode self-interference of optical frequency comb is fine-tuned from 3 meters (m) to 3.33 m. The measurement scales of 3 m and 3.33 m are further combined to obtain a combined measurement scale of 2.7 kilometers (km), thus improving the measurement range to 1.35 km. Meanwhile, an optical frequency comb with a repetition rate of 100 MHz is used to generate an inter-mode self-interference signal with 1 gigahertz (GHz) as a fine measurement scale, which achieves a high measurement accuracy at the same time. However, the inter-mode self-interference distance measurement method requires manual fine-tuning of the repetition rate of the optical frequency comb, so that the measurement scale of the inter-mode self-interference at each order is not synchronously generated. Thus, the inter-mode self-interference distance measurement method cannot perform coarse and fine measurement and calculation of a target distance, synchronously, which sacrifices a high-speed measurement advantage of the inter-mode self-interference distance measurement technology.

The multi-wavelength inter-mode mutual-interference distance measurement method based on coherent dual optical frequency combs is proposed by Wang Guo-Chao et al. (Wang Guo-Chao et al., Analysis of an innovative method for large-scale high-precision absolute distance measurement based on multi-heterodyne interference of dual optical frequency combs, Acta Physica Sinica, 2013, 62 (7): 070601) The multi-wavelength inter-mode mutual-interference distance measurement method utilizes two coherent optical frequency combs to realize inter-mode interference between the two coherent optical frequency combs on a photodetector. An interference signal with the lowest frequency can be thereby extracted to generate the maximum measurement scale. In this method, a utilization of the dual optical frequency comb with a repetition rate difference of 100 kilohertz (kHz) and an offset frequency difference of 0 is proposed. Through the inter-mode mutual-interference between dual combs, a measurement scale with a wavelength of 3 km is generated, and the measurement range is 1.5 km. Meanwhile, the traditional inter-mode self-interference distance measurement technology and the optical frequency comb with the repetition rate of 100 MHz are used to synchronously generate the fine measurement scale with high-frequency, which can balance high measurement accuracy and high measurement speed. However, the multi-wavelength inter-mode mutual-interference distance measurement method not only requires the dual optical frequency combs have a stable repetition rate to satisfy requirements of the traditional inter-mode self-interference distance measurement technology, but also requires the dual optical frequency combs have a stable offset frequency difference to ensure stability of the inter-mode mutual-interference signal between the dual optical frequency combs, so that the multi-wavelength inter-mode mutual-interference distance measurement method proposes a higher cost requirement for a dual-comb light source. A set of optical frequency comb products with full frequency stabilization of repetition rate and offset frequency satisfying the above requirements on a market cost more than 2 million yuan. A price of light source of two sets of dual-comb systems with mutually locked frequencies exceeds 5 million yuan. Meanwhile, the system covers an area of more than 4 square meters, and it is difficult to integrate and miniaturize.

The related art has the following disadvantages.

1. It is difficult for the traditional single-comb inter-mode self-interference distance measurement method to balance kilometer-level wide range and micron-level high precision, the frequency difference (i.e., repetition rate) between adjacent modes of the commonly used optical frequency comb is usually larger than 1 megahertz (MHz), and the maximum measurement range corresponding to the inter-mode self-interference distance measurement of a single frequency comb is only a few hundred meters. In order to further expand the measurement range, the optical frequency comb with lower repetition rate can be selected to generate the inter-mode self-interference signal with a larger measurement scale. However, the inter-mode self-interference of the optical frequency comb with the lower repetition rate is difficult to generate the measurement scale signal with high-frequency, and it difficult to maintain the original measurement accuracy while improving the measurement range caused by introduced the additional phase noise. Therefore, how to ensure the original measurement accuracy while obtain the measurement scale with larger wavelength is the main problem to further improve the measurement range of the inter-mode self-interference currently.

2. The inter-mode self-interference distance measurement method with single frequency comb requires manual fine-tuning of the repetition rate of the optical frequency comb, so that the measurement scale of the inter-mode self-interference at each order is not synchronously generated, and the inter-mode self-interference distance measurement method cannot perform coarse and fine measurement and calculation on the target distance synchronously, which sacrifices the high-speed measurement advantage of the inter-mode self-interference distance measurement technology.

3. The multi-wavelength inter-mode mutual-interference distance measurement method based on coherent dual optical frequency combs not only requires the dual optical frequency combs have a stable repetition rate to satisfy requirements of the traditional inter-mode self-interference distance measurement technology, but also requires the dual optical frequency combs have a stable offset frequency difference to ensure stability of the inter-mode interference signal between the dual optical frequency combs, so that the multi-wavelength inter-mode mutual-interference distance measurement method proposes a higher cost requirement for the dual-comb light source. A set of optical frequency comb products with full frequency stabilization of repetition rate and offset frequency satisfying the above requirements on the market cost more than 2 million yuan. The price of light source of two sets of the dual-comb systems with mutually locked frequencies exceeds 5 million yuan. Meanwhile, the system covers an area of more than 4 square meters, and it is difficult to integrate and miniaturize.

In summary, there is a lack of a distance measurement device and method in the field of distance measurement technology of inter-mode self-interference or mutual-interference of optical frequency combs that can achieve a range of up to a kilometer, while also considering high measurement accuracy, high measurement speed, and low system cost at present.

SUMMARY

In order to solve the above technical problems, the disclosure provides a distance measurement device and method based on secondary mixing of inter-mode self-interference signals of dual optical frequency combs, and technical solutions adopted by the disclosure are as follows.

A distance measurement device based on secondary mixing of inter-mode self-interference signals of optical frequency combs is provided, and the distance measurement device includes: a dual-comb light source, a detection optical module of the inter-mode self-interference signals of the optical frequency combs and a generation, acquisition and calculation module of inter-mode self-interference secondary mixing signals of the optical frequency combs.

The dual-comb light source is configured to emit a dual-comb laser into the detection optical module to obtain the inter-mode self-interference signals of the optical frequency combs carrying to-be-measured distance information; and the detection optical module is configured to output the inter-mode self-interference signals of the optical frequency combs into the generation, acquisition and calculation module to generate the inter-mode self-interference secondary mixing signals, to thereby achieve data acquisition and obtain a distance measurement result.

The dual-comb light source includes: a first optical frequency comb laser and a second optical frequency comb laser; a repetition rate of the first optical frequency comb laser is locked to $f_{r1}$, and a repetition rate of the second optical frequency comb laser is locked to $f_{r2}$; the first optical frequency comb laser and the second optical frequency comb laser are configured to emit a first optical frequency comb and a second optical frequency comb, respectively; and offset frequencies of the first optical frequency comb and the second optical frequency comb are unlocked.

A $N^{th}$ order inter-mode self-interference signal of the first optical frequency comb is a signal generated by beat frequency interference between paired longitudinal modes with a frequency interval of $Nf_{r1}$ in comb modes of the first optical frequency comb.

An $M^{th}$ order inter-mode self-interference signal of the second optical frequency comb is a signal generated by beat frequency interference between paired longitudinal modes with a frequency interval of $Mf_{r2}$ in comb modes of the second optical frequency comb.

A value of N is determined by a measurement accuracy requirement, and the higher frequency interval $Nf_{r1}$, the higher the measurement accuracy under a condition of same interference phase measurement accuracy.

In an embodiment, the first optical frequency comb and the second optical frequency comb are linearly polarized light and have mutually orthogonal polarization directions.

In an embodiment, the detection optical module includes: a detector for the second optical frequency comb at the reference end, a detector for the first optical frequency comb at the reference end, a polarizing beam splitter at the reference end, a half-wave plate at the reference end, a target reflector, a 50/50 beam splitter, a half-wave plate at a measurement end, a polarizing beam splitter at the measurement end, a detector for the first optical frequency comb at the measurement end and a detector for the second optical frequency comb at the measurement end.

The first optical frequency comb emitted by the dual-comb light source is reflected and transmitted at the 50/50 beam splitter, the reflected light of the first frequency comb is reflected at the polarizing beam splitter at the reference end after passing through the half-wave plate at the reference end, and the first optical frequency comb is illuminated on the detector for the first optical frequency comb at the reference end after reflecting. The transmitted light of the first frequency comb obtained at the 50/50 beam splitter is reflected at the target reflector, the reflected light of the first optical frequency comb obtained at the target reflector returns to the 50/50 beam splitter to be reflected and transmitted, then the reflected light of the first optical frequency comb is reflected at the polarizing beam splitter at the measurement end after passing through the half-wave plate at the measurement end, and the first optical frequency comb is illuminated on the detector for the first optical frequency comb at the measurement end after reflecting (i.e., obtaining first reflected light and first transmitted light of the first optical frequency comb at the 50/50 beam splitter, obtaining second reflected light of the first optical frequency comb at the polarizing beam splitter at the reference end, obtaining third reflected light of the first optical frequency comb at the target reflector, obtaining fourth reflected light of the first optical frequency comb at the 50/50 beam splitter, and obtaining fifth reflected light of the first frequency comb at the polarizing beam splitter at the measurement end).

The second optical frequency comb emitted by the dual-comb light source is reflected and transmitted at the 50/50 beam splitter, the reflected light of the second frequency comb is transmitted at the polarizing beam splitter at the reference end after passing through the half-wave plate at the reference end, and the second optical frequency comb is illuminated on the detector for the second optical frequency comb at the reference end after transmitting. The transmitted light of the second optical frequency comb obtained at the 50/50 beam splitter is reflected at the target reflector, the reflected light of the second optical frequency comb obtained at the target reflector returns to the 50/50 beam splitter to be reflected and transmitted, then the reflected light of the second optical frequency comb is transmitted at the polarizing beam splitter at the measurement end after passing through the half-wave plate at the measurement end, and the second optical frequency comb is illuminated on the detector for the second optical frequency comb at the measurement end after transmitting (i.e., obtaining first reflected light and first transmitted light of the second optical frequency comb at the 50/50 beam splitter, obtaining second transmitting light of the second optical frequency comb at the polarizing beam splitter at the reference end, obtaining third reflected light of the second optical frequency comb at the target reflector, obtaining fourth reflected light of the second optical frequency comb at the 50/50 beam splitter, and obtaining third transmitted light of the second optical frequency comb at the polarizing beam splitter at the measurement end).

In an embodiment, the inter-mode self-interference signals of the optical frequency combs include:

$N^{th}$ order inter-mode self-interference signals of the first optical frequency comb generated at the detector for the first optical frequency comb at the reference end and the detector for the first optical frequency comb at the measurement end; and $M^{th}$ order inter-mode self-interference signals of the second optical frequency comb generated at the detector for the second optical frequency comb at the reference end and the detector for the second optical frequency comb at the measurement end.

In an embodiment, the generation, acquisition and calculation module includes: a coarse measurement signal generating mixer at the reference end, a fine measurement signal generating mixer at the reference end, a local oscillator, a fine measurement signal generating mixer at the measurement end, a coarse measurement signal generating mixer at the measurement end, a data acquisition card and an upper computer.

The $N^{th}$ order inter-mode self-interference signal of the first optical frequency comb generated at the detector for the first optical frequency comb at the reference end is divided into two paths; one path of the $N^{th}$ order inter-mode self-interference signal at the reference end performs, at the coarse measurement signal generating mixer at the reference end, secondary mixing with the $M^{th}$ order inter-mode self-interference signal of the second optical frequency comb generated at the detector for the second optical frequency comb at the reference end, to generate a secondary mixing coarse measurement signal with a longest measurement scale at the reference end; and the other path of the $N^{th}$ order inter-mode self-interference signal at the reference end performs, at the fine measurement signal generating mixer at the reference end, mixing with a local oscillator signal emitted by the local oscillator, to thereby demodulate distance fine measurement information at the reference end to a low frequency band to obtain a mixing fine measurement signal at the reference end.

The $N^{th}$ order inter-mode self-interference signal of the first optical frequency comb generated at the detector for the first optical frequency comb at the measurement end is divided into two paths; one path of the $N^{th}$ order inter-mode self-interference signal at the measurement end performs, at the coarse measurement signal generating mixer at the measurement end, secondary mixing with the $M^{th}$ order inter-mode self-interference signal of the second optical frequency comb generated at the detector for the second optical frequency comb at the measurement end, to generate a secondary mixing coarse measurement signal with the longest measurement scale at the measurement end; and the other path of the $N^{th}$ order inter-mode self-interference signal at the measurement end performs, at the fine measurement signal generating mixer at the measurement end, mixing with a local oscillator signal emitted by the local oscillator, to thereby demodulate distance fine measurement information at the measurement end to the low frequency band to obtain a mixing fine measurement signal at the measurement end.

The secondary mixing coarse measurement signal with the longest measurement scale at the reference end, the mixing fine measurement signal at the reference end, the secondary mixing coarse measurement signal with the longest measurement scale at the measurement end and the mixing fine measurement signal at the measurement end are transmitted to different acquisition channels of the data acquisition card, and then are transmitted to the upper computer to be calculated.

In an embodiment, the inter-mode self-interference secondary mixing signals of the optical frequency combs are signals generated by secondary mixing between the $N^{th}$ order inter-mode self-interference signals of the first optical frequency comb and the $M^{th}$ order inter-mode self-interference signals of the second optical frequency comb; a frequency $f_{2nd}$ of the inter-mode self-interference secondary mixing signals is a frequency difference of the inter-mode self-interference signals, and the frequency $f_{2nd}$ is expressed as $f_{2nd}=|Nf_{r1}-Mf_{r2}|$, and a measurement unambiguous range of phase corresponding to the frequency $f_{2nd}$ is expressed as $$L_{NAR} = \frac{c}{2nf_{2nd}},$$

where c represents a speed of light in vacuum, n represents an equivalent refractive index of the inter-mode self-interference secondary mixing signals, and a value of n is $$n = \frac{|n_1 N f_{r1} - n_2 M f_{r2}|}{f_{2nd}},$$

where $n_1$ represents a group refractive index of the first optical frequency comb, and $n_2$ represents a group refractive index of the second optical frequency comb.

The inter-mode self-interference secondary mixing signals are configured for coarse distance measurement, and the frequency $f_{2nd}$ satisfies an inter-stage transition condition; and a value of a positive integer M is determined by the measurement unambiguous range and the frequency interval $Nf_{r1}$, and the lower the frequency $f_{2nd}$, the lager the measurement unambiguous range.

A distance measurement method based on secondary mixing of inter-mode self-interference signals of optical frequency combs is provided, and the distance measurement method includes:

step 1, starting a dual-comb light source, and setting repetition rates $f^{r1}$ and $f^{r2}$ of dual combs to make a to-be-measured distance L not exceed a half of a measurement unambiguous range $L_{NAR}$, and to make frequencies of secondary mixing coarse measurement signals respectively generated at a coarse measurement signal generating mixer at a reference end and a coarse measurement signal generating mixer at a measurement end lower than a half of an acquisition frequency of a data acquisition card; and starting a local oscillator to emit a local oscillator signal with a frequency of $f_{Lo}$, and setting the frequency $f_{Lo}$ to make frequencies of mixing fine measurement signals respectively generated at a fine measurement signal generating mixer at the reference end and a fine measurement signal generating mixer at the measurement end lower than the half of the acquisition frequency of the data acquisition card;

step 2, placing a target reflector at a zero position; acquiring and calculating, by using the data acquisition card and an upper computer, the mixing fine measurement signals respectively generated at the fine measurement signal generating mixer at the reference end and the fine measurement signal generating mixer at the measurement end to obtain a first fine phase difference $P_{fine0}$ between the measurement end and the reference end; and acquiring and calculating, by using the data acquisition card and the upper computer, the secondary mixing coarse measurement signals respectively generated at the coarse measurement signal generating mixer at the reference end and the coarse measurement signal generating mixer at the measurement end to obtain a first coarse phase difference $\varphi_{coarse0}$ between the measurement end and the reference end;

step 3, moving the target reflector to a position of the to-be-measured distance L; acquiring and calculating, by using the data acquisition card and the upper computer, the mixing fine measurement signals respectively generated at the fine measurement signal generating mixer at the reference end and the fine measurement signal generating mixer at the measurement end to obtain a second fine phase difference $\varphi_{fine}$ between the measurement end and the reference end; and acquiring and calculating, by using the data acquisition card and the upper computer, the secondary mixing coarse measurement signals respectively generated at the coarse measurement signal generating mixer at the reference end and the coarse measurement signal generating mixer at the measurement end to obtain a second coarse phase difference $\varphi_{coarse}$ between the measurement end and the reference end;

step 4, calculating a fine measurement distance $L_{fine}$ and a coarse measurement distance $L_{coarse}$, where calculation formulas of the fine measurement distance $L_{fine}$ and the coarse measurement distance $L_{coarse}$ are expressed as follows:

$$L_{fine} = \frac{\varphi_{fine} - \varphi_{fine0}}{2\pi} \cdot \frac{c}{2n_1 N f_{r1}};$$

$$L_{coarse} = \frac{\varphi_{coarse} - \varphi_{coarse0}}{2\pi} \cdot \frac{c}{2|n_1 N f_{r1} - n_2 M f_{r2}|};$$

step 5, calculating the to-be-measured distance L, where a calculation formula of the to-be-measured distance L is expressed as follows:

$$L = L_{fine} + \frac{c}{2n_1 N f_{r1}} \cdot \text{floor}\left[\frac{2n_1 N f_{r1}(L_{coarse} - L_{fine})}{c} + \frac{1}{2}\right];$$

where floor[ ] represents rounding down, and a prerequisite for establishment of the calculation formula of the to-be-measured distance L is to satisfy an inter-stage transition condition;

step 6, determining, by using the inter-stage transition condition, whether the calculation formula of the to-be-measured distance L is established; where a formula of the inter-stage transition condition is expressed as follows:

$$U(L_{coarse}) < \frac{\lambda_{fine}}{4} = \frac{c}{4n_1 N f_{r1}};$$

where $U(L_{coarse})$ represents a coarse measurement uncertainty, and $\lambda_{fine}$ represents a fine measurement scale;

selecting, in response to the secondary mixing coarse measurement signals and $N^{th}$ order inter-mode self-interference fine measurement signals of a first optical frequency comb not satisfying the inter-stage transition condition, a $P^{th}$ order inter-mode self-interference signal of the first optical frequency comb with a frequency of $Pf_{r1}$ and a $Q^{th}$ order inter-mode self-interference signal of the second optical frequency comb with a frequency of $Qf_{r2}$, and taking an inter-mode self-interference secondary mixing signal with a frequency of $|Pf_{r1}-Qf_{r2}|$ as an intermediate transition measurement scale to satisfy an inter-stage transition condition of a coarse measurement scale and the intermediate transition measurement scale; where a formula of the inter-stage transition condition of the coarse measurement scale and the intermediate transition measurement scale is expressed as follows:

$$U(L_{coarse}) < \frac{\lambda_{middle}}{4} = \frac{c}{4n|Pf_{r1}-Qf_{r2}|} = \frac{c \cdot |Nf_{r1}-Mf_{r2}|}{4|n_1Nf_{r1}-n_2Mf_{r2}| \cdot |Pf_{r1}-Qf_{r2}|};$$

where $\lambda_{middle}$ represents a wavelength of the inter-mode self-interference secondary mixing signal with the frequency of $|Pf_{r1}-Qf_{r2}|$;

performing the step 2 to the step 5 to measure a phase difference $\varphi_{middle0}$ between the measurement end and the reference end of the inter-mode self-interference secondary mixing signal with the frequency of $|Pf_{r1}-Qf_{r2}|$ at the zero position and a phase difference $\varphi_{middle}$ between the measurement end and the reference end of the inter-mode self-interference secondary mixing signal with the frequency of $|Pf_{r1}-Qf_{r2}|$ at the position of the to-be-measured distance L, and calculating a distance measurement result of the intermediate transition measurement scale by using a formula expressed as follows:

$$L_{middle} = \frac{\varphi_{middle}-\varphi_{middle0}}{2\pi} \cdot \frac{c \cdot |Nf_{r1}-Mf_{r2}|}{2|n_1Nf_{r1}-n_2Mf_{r2}| \cdot |Pf_{r1}-Qf_{r2}|};$$

making the intermediate transition measurement scale satisfy an inter-stage transition condition of the intermediate transition measurement scale and a fine measurement scale, where a formula of the inter-stage transition condition of the intermediate transition measurement scale and the fine measurement scale is expressed as follows:

$$U(L_{middle}) < \frac{\lambda_{fine}}{4} = \frac{c}{4n_1Nf_{r1}};$$

taking, by selecting the $P^{th}$ order inter-mode self-interference signal of the first optical frequency comb and the $Q^{th}$ order inter-mode self-interference signal of the second optical frequency comb, the inter-mode self-interference secondary mixing signal with the frequency of $|Pf_{r1}-Qf_{r2}|$ as the intermediate transition measurement scale to satisfy the inter-stage transition condition of the coarse measurement scale and the intermediate transition measurement scale and the inter-stage transition condition of the intermediate transition measurement scale and the fine measurement scale, to thereby achieve accuracy transmission among the coarse measurement scale, the intermediate transition measurement scale and the fine measurement scale; and step 7, calculating, by using an inter-mode self-interference secondary mixing signal with a frequency of $f_{2nd}$ as a coarse measurement scale, a corresponding coarse measurement distance $L_{coarse0}$, and calculating, by using the inter-mode self-interference secondary mixing signal with the frequency of $|Pf_{r1}-Qf_{r2}|$ as the intermediate transition measurement scale, a corresponding intermediate distance $L_{middle}$ after the intermediate transition measurement scale satisfies the inter-stage transition condition of the coarse measurement scale and the intermediate transition measurement scale and the inter-stage transition condition of the intermediate transition measurement scale and the fine measurement scale; and substituting the coarse measurement distance $L_{coarse0}$ and the intermediate distance $L_{middle}$ into the formula of the step 5 to obtain a transition distance, and recording the transition distance as $L_{coarse-new}$; where a formula for calculating the transition distance $L_{coarse-new}$ is expressed as follows:

$$L_{coarse-new} = L_{middle} + \frac{c}{2n|Pf_{r1}-Qf_{r2}|} \cdot floor\left[\frac{2n|Pf_{r1}-Qf_{r2}|(L_{coarse0}-L_{middle})}{c} + \frac{1}{2}\right];$$

calculating, by using an inter-mode self-interference signal with a frequency of $Nf_{r1}$ as a fine measurement scale, the fine measurement distance $L_{fine}$; and substituting the transition distance $L_{coarse-new}$ and the fine measurement distance $L_{fine}$ into the formula of the step 5 to obtain the to-be-measured distance L; where a formula of the to-be-measured distance L is expressed as follows:

$$L = L_{fine} + \frac{c}{2n_1Nf_{r1}} \cdot floor\left[\frac{2n_1Nf_{r1}(L_{coarse-new}-L_{fine})}{c} + \frac{1}{2}\right].$$

The disclosure has the following beneficial effects.

(1) The disclose can achieve an unambiguous measurement range that spans from hundreds of meters to several kilometers while maintain a distance measurement precision at the level of ten micrometers or even sub-micrometers. The disclosure uses the dual-comb light source, which can not only generate the inter-mode self-interference signal with higher frequency as the fine measurement scale, but also generate the inter-mode self-interference secondary mixing signal with lower frequency as the coarse measurement scale, so as to achieve coarse and fine measurements at different scales, and effectively balance the measurement range and the measurement accuracy by combining synchronously generated intermediate transition measurement scale and inter-stage transition methods.

(2) The disclosure can achieve strong real-time property of measurement. The disclosure achieves synchronous generation, synchronous measurement and synchronous calculation of the coarse and fine measurement scales, and compared to other large-range distance measurement methods by scanning parameters to adjust the measurement scale, the method of the disclosure has the strong real-time property.

(3) The light source has low cost and the scale of the system is small. The disclosure does not rely on a fully stable frequency dual-comb light source, which is expensive and bulky, while only requires a dual-comb light source with repetition rate stabilized. Compared to other large-range distance measurement methods which generate the coarse and fine measurement scale rely on the fully stable frequency dual-comb light source, the disclosure has the low cost of the light source and the small scale of the system.

LIST OF REFERENCE NUMBERS

1—dual-comb light-source; 2—detection optical module of inter-mode self-interference signals of optical frequency combs; 3—generation, acquisition and calculation module of inter-mode self-interference secondary mixing signals of optical frequency combs; 4—first optical frequency comb laser; 5—second optical frequency comb laser; 6—detector for second optical frequency comb at reference end; 7—detector for first optical frequency comb at reference end; 8—polarizing beam splitter at reference end; 9—half-wave plate at reference end; 10—target reflector; 11—50/50 beam splitter; 12—half-wave plate at measurement end; 13—polarizing beam splitter at measurement end; 14—detector for first optical frequency comb at measurement end; 15—detector for second optical frequency comb at measurement end; 16—coarse measurement signal generating mixer at reference end; 17—fine measurement signal generating mixer at reference end; 18—local oscillator; 19—fine measurement signal generating mixer at measurement end; 20—coarse measurement signal generating mixer at measurement end; 21—data acquisition card; 22—upper computer; 23—coarse measurement signal generating wave filter at reference end; 24—fine measurement signal generating wave filter at reference end; 25—fine measurement signal generating wave filter at measurement end; 26—coarse measurement signal generating wave filter at measurement end.

DETAILED DESCRIPTION OF EMBODIMENTS

Figure 1:
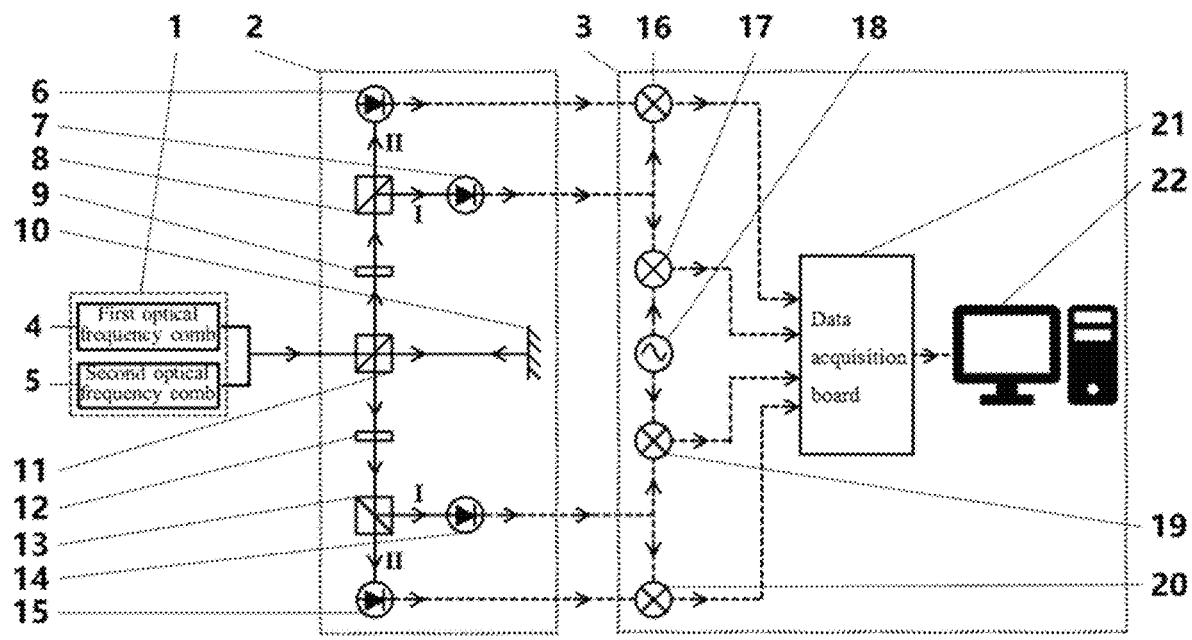
FIG. 1 illustrates a principle schematic diagram of a distance measurement device based on secondary mixing of inter-mode self-interference signals of optical frequency combs according to an embodiment of the disclosure.

Technical solutions in embodiments of the disclosure will be clearly and completely described in conjunction with FIGS. 1-3 in the embodiments of the disclosure below. Apparently, the described embodiments merely some of the embodiments of the disclosure, not all of them. If not specifically specified, technical means used in the embodiments are conventional means well-known to those skilled in the art.

The disclosure is achieved through the following technical solutions. The disclosure provides a distance measurement device based on secondary mixing of inter-mode self-interference signals of optical frequency combs, and the distance measurement device includes: a dual-comb light source 1, a detection optical module 2 of the inter-mode self-interference signals of the optical frequency combs and a generation, acquisition and calculation module 3 of inter-mode self-interference secondary mixing signals of the optical frequency combs. The dual-comb light source 1 is configured to emit a dual-comb laser into the detection optical module 2 to obtain the inter-mode self-interference signals of the optical frequency combs carrying to-be-measured distance information. The detection optical module 2 is configured to transmit the inter-mode self-interference signals of the optical frequency combs to the generation, acquisition and calculation module 3 to generate the inter-mode self-interference secondary mixing signals of the optical frequency combs, to thereby achieve data acquisition and obtain a distance measurement result.

The dual-comb light source 1 includes: a first optical frequency comb laser 4 and a second optical frequency comb laser 5. A repetition rate of the first optical frequency comb laser 4 is locked to $f_{r1}$, and a repetition rate of the second optical frequency comb laser 5 is locked to $f_{r2}$. Offset frequencies of a first optical frequency comb and a second optical frequency comb run freely and are unlocked. The first optical frequency comb and the second optical frequency comb emitted by the dual-comb light source 1 are linearly polarized light and have mutually orthogonal polarization directions (i.e., the polarization directions of the first optical frequency comb and the second optical frequency comb are orthogonal to each other).

In an embodiment, the detection optical module 2 includes: a detector 6 for the second optical frequency comb at a reference end, a detector 7 for the first optical frequency comb at the reference end, a polarizing beam splitter 8 at the reference end, a half-wave plate 9 at the reference end, a target reflector 10, a 50/50 beam splitter 11, a half-wave plate 12 at a measurement end, a polarizing beam splitter 13 at the measurement end, a detector 14 for the first optical frequency comb at the measurement end and a detector 15 for the second optical frequency comb at the measurement end.

The first optical frequency comb emitted by the dual-comb light source 1 is reflected and transmitted at the 50/50 beam splitter 11, the reflected light of the first frequency comb is reflected at the polarizing beam splitter 8 at the reference end after passing through the half-wave plate 9 at the reference end, and the first optical frequency comb is illuminated on the detector 7 for the first optical frequency comb at the reference end after reflecting. The transmitted light of the first frequency comb obtained at the 50/50 beam splitter 11 is reflected at the target reflector 10, the reflected light of the first optical frequency comb obtained at the target reflector 10 returns to the 50/50 beam splitter 11 to be reflected and transmitted, then the reflected light of the first optical frequency comb is reflected at the polarizing beam splitter 13 at the measurement end after passing through the half-wave plate 12 at the measurement end, and the first optical frequency comb is illuminated on the detector 14 for the first optical frequency comb at the measurement end after reflecting (i.e., obtaining first reflected light and first transmitted light of the first optical frequency comb at the 50/50 beam splitter 11, obtaining second reflected light of the first optical frequency comb at the polarizing beam splitter 8 at the reference end, obtaining third reflected light of the first optical frequency comb at the target reflector 10, obtaining fourth reflected light of the first optical frequency comb at the 50/50 beam splitter 11, and obtaining fifth reflected light of the first frequency comb at the polarizing beam splitter 13 at the measurement end).

The second optical frequency comb emitted by the dual-comb light source 1 is reflected and transmitted at the 50/50 beam splitter 11, the reflected light of the second frequency comb is transmitted at the polarizing beam splitter 8 at the reference end after passing through the half-wave plate 9 at the reference end, and the second optical frequency comb is illuminated on the detector 6 for the second optical frequency comb at the reference end after transmitting. The transmitted light of the second optical frequency comb obtained at the 50/50 beam splitter 11 is reflected at the target reflector 10, the reflected light of the second optical frequency comb obtained at the target reflector 10 returns to the 50/50 beam splitter 11 to be reflected and transmitted, then the reflected light of the second optical frequency comb is transmitted at the polarizing beam splitter 13 at the measurement end after passing through the half-wave plate 12 at the measurement end, and the second optical frequency comb is illuminated on the detector 15 for the second optical frequency comb at the measurement end after transmitting (i.e., obtaining first reflected light and first transmitted light of the second optical frequency comb at the 50/50 beam splitter 11, obtaining second transmitting light of the second optical frequency comb at the polarizing beam splitter 8 at the reference end, obtaining third reflected light of the second optical frequency comb at the target reflector 10, obtaining fourth reflected light of the second optical frequency comb at the 50/50 beam splitter 11, and obtaining third transmitted light of the second optical frequency comb at the polarizing beam splitter 13 at the measurement end).

In an embodiment, the inter-mode self-interference signals of the optical frequency combs include: $N^{th}$ order inter-mode self-interference signals of the first optical frequency comb generated at the detector 7 for the first optical frequency comb at the reference end and the detector 14 for the first optical frequency comb at the measurement end, and $M^{th}$ order inter-mode self-interference signals of the second optical frequency comb generated at the detector 6 for the second optical frequency comb at the reference end and the detector 15 for the second optical frequency comb at the measurement end. The $N^{th}$ order inter-mode self-interference signal of the first optical frequency comb is the signal generated by beat frequency interference between paired longitudinal modes with a frequency interval of $Nf_{r1}$ in comb modes of the first optical frequency comb. The $M^{th}$ order inter-mode self-interference signal of the second optical frequency comb is the signal generated by beat frequency interference between paired longitudinal modes with a frequency interval of $Mf_{r2}$ in the comb modes of the second optical frequency comb. The $N^{th}$ order inter-mode self-interference signals of the first optical frequency comb are configured for fine distance measurement. A value of the positive integer N is determined by a measurement accuracy requirement, and the higher frequency interval $Nf_{r1}$, the higher the measurement accuracy under a condition of same interference phase measurement accuracy.

In an embodiment, the generation, acquisition and calculation module 3 includes: a coarse measurement signal generating mixer 16 at the reference end, a fine measurement signal generating mixer 17 at the reference end, a local oscillator 18, a fine measurement signal generating mixer 19 at the measurement end, a coarse measurement signal generating mixer 20 at the measurement end, a data acquisition card 21 and an upper computer 22.

The $N^{th}$ order inter-mode self-interference signal of the first optical frequency comb generated at the detector 7 for the first optical frequency comb at the reference end is divided into two paths. One path of the $N^{th}$ order inter-mode self-interference signal at the reference end performs, at the coarse measurement signal generating mixer 16 at the reference end, secondary mixing with the $M^{th}$ order inter-mode self-interference signal of the second optical frequency comb generated at the detector 6 for the second optical frequency comb at the reference end, to generate a secondary mixing coarse measurement signal with a longest measurement scale at the reference end. The other path of the $N^{th}$ order inter-mode self-interference signal at the reference end performs, at the fine measurement signal generating mixer 17 at the reference end, mixing with a local oscillator signal emitted by the local oscillator 18, to thereby demodulate distance fine measurement information at the reference end to a low frequency band to obtain a mixing fine measurement signal at the reference end.

The $N^{th}$ order inter-mode self-interference signal of the first optical frequency comb generated at the detector 14 for the first optical frequency comb at the measurement end is divided into two paths. One path of the $N^{th}$ order inter-mode self-interference signal at the measurement end performs, at the coarse measurement signal generating mixer 20 at the measurement end, secondary mixing with the $M^{th}$ order inter-mode self-interference signal of the second optical frequency comb generated at the detector 15 for the second optical frequency comb at the measurement end, to generate a secondary mixing coarse measurement signal with the longest measurement scale at the measurement end. The other path of the $N^{th}$ order inter-mode self-interference signal at the measurement end performs, at the fine measurement signal generating mixer 19 at the measurement end, mixing with a local oscillator signal emitted by the local oscillator 18, to thereby demodulate distance fine measurement information at the measurement end to the low frequency band to obtain a mixing fine measurement signal at the measurement end.

The secondary mixing coarse measurement signal with the longest measurement scale at the reference end, the mixing fine measurement signal at the reference end, the secondary mixing coarse measurement signal with the longest measurement scale at the measurement end, and the mixing fine measurement signal at the measurement end are respectively transmitted to different acquisition channels of the data acquisition card 21, and then are transmitted to the upper computer 22 to perform coarse and fine calculation of phase and to-be-measured distance.

In an embodiment, the inter-mode self-interference secondary mixing signal of the optical frequency combs is the signal generated by secondary mixing between the $N^{th}$ order inter-mode self-interference signal of the first optical frequency comb and the $M^{th}$ order inter-mode self-interference signal of the second optical frequency comb. A frequency $f_{2nd}$ of the inter-mode self-interference secondary mixing signal is a frequency difference of the inter-mode self-interference signals, and the frequency $f_{2nd}$ is expressed as $f_{2nd} = |Nf_{r1} - Mf_{r2}|$. A measurement unambiguous range of phase corresponding to the frequency $f_{2nd}$ is expressed $$L_{NAR} = \frac{c}{2n f_{2nd}},$$

represents a speed of light in vacuum, and n represents an equivalent refractive index of the inter-mode self-interference secondary mixing signals. A value of n is $$n = \frac{|n_1 N f_{r1} - n_2 M f_{r2}|}{f_{2nd}},$$

$n_1$ represents a group refractive index of the first optical frequency comb, and $n_2$ represents a group refractive index of the second optical frequency comb. The inter-mode self-interference secondary mixing signals are configured for coarse distance measurement, and the frequency $f_{2nd}$ should satisfy an inter-stage transition condition. A value of the positive integer M is determined by the measurement unambiguous range and the frequency interval $Nf_{r1}$, and the lower the frequency $f_{2nd}$, the lager the measurement unambiguous range.

The disclosure provides a distance measurement method based on secondary mixing of inter-mode self-interference signals of optical frequency combs, the distance measurement method is achieved by using the distance measurement device described above, and the distance measurement method specifically includes the following steps 1 to 7.

In step 1, the dual-comb light-source 1 is started. Repetition rates $f_{r1}$ and $f_{r2}$ of dual combs are set to make a to-be-measured distance/not exceed a half of the measurement unambiguous range $L_{NAR}$, and to make frequencies of secondary mixing coarse measurement signals respectively generated at the coarse measurement signal generating mixer 16 at the reference end and the coarse measurement signal generating mixer 20 at the measurement end lower than a half of an acquisition frequency of the data acquisition card 21. The local oscillator 18 is started to emit a local oscillator signal with a frequency of $f_{LO}$. The frequency of $f_{LO}$ is set to make frequencies of mixing fine measurement signals respectively generated at the fine measurement signal generating mixer 17 at the reference end and a fine measurement signal generating mixer 19 at the measurement end lower than the half of the acquisition frequency of the data acquisition card 21.

In step 2, the target reflector 10 is placed at a zero position. The data acquisition card 21 and the upper computer 22 are used to acquire and calculate the mixing fine measurement signals respectively generated at the fine measurement signal generating mixer 17 at the reference end and the fine measurement signal generating mixer 19 at the measurement end to obtain a first fine phase difference $\varphi_{fine0}$ between the measurement end and the reference end. The data acquisition card 21 and the upper computer 22 are used to acquire and calculate the secondary mixing coarse measurement signals respectively generated at the coarse measurement signal generating mixer 16 at the reference end and the coarse measurement signal generating mixer 20 at the measurement end to obtain a first coarse phase difference $\varphi_{coarse0}$ between the measurement end and the reference end.

In step 3, the target reflector 10 is moved to a position of the to-be-measured distance L. The data acquisition card 21 and the upper computer 22 are used to acquire and calculate the mixing fine measurement signals respectively generated at the fine measurement signal generating mixer 17 at the reference end and the fine measurement signal generating mixer 19 at the measurement end to obtain a second fine phase difference $\varphi_{fine}$ between the measurement end and the reference end. The data acquisition card 21 and the upper computer 22 are used to acquire and calculate the secondary mixing coarse measurement signals respectively generated at the coarse measurement signal generating mixer 16 at the reference end and the coarse measurement signal generating mixer 20 at the measurement end to obtain a second coarse phase difference $\varphi_{coarse}$ between the measurement end and the reference end.

In step 4, a fine measurement distance $L_{fine}$ and a coarse measurement distance $L_{coarse}$ are calculated, where calculation formulas of the fine measurement distance $L_{fine}$ and the coarse measurement distance $L_{coarse}$ are expressed as follows:

$$L_{fine} = \frac{\varphi_{fine} - \varphi_{fine0}}{2\pi} \cdot \frac{c}{2n_1 N f_{r1}};$$

$$L_{coarse} = \frac{\varphi_{coarse} - \varphi_{coarse0}}{2\pi} \cdot \frac{c}{2|n_1 N f_{r1} - n_2 M f_{r2}|}.$$

In step 5, the to-be-measured distance L is calculated, where a calculation formula of the to-be-measured distance L is expressed as follows:

$$L = L_{fine} + \frac{c}{2n_1 N f_{r1}} \cdot \text{floor}\left[\frac{2n_1 N f_{r1}(L_{coarse} - L_{fine})}{c} + \frac{1}{2}\right];$$

where floor[ ] represents rounding down, and a prerequisite for establishment of the calculation formula of the to-be-measured distance L is to satisfy an inter-stage transition condition.

In step 6, the inter-stage transition condition is used to determine whether the calculation formula of the to-be-measured distance L is established; where a formula of the inter-stage transition condition is expressed as follows:

$$U(L_{coarse}) < \frac{\lambda_{fine}}{4} = \frac{c}{4n_1 N f_{r1}};$$

where $U(L_{coarse})$ represents a coarse measurement uncertainty, and $\lambda_{fine}$ represents a fine measurement scale.

A $P^{th}$ order inter-mode self-interference signal of the first optical frequency comb with a frequency of $Pf_{r1}$ and a $Q^{th}$ order inter-mode self-interference signal of the second optical frequency comb with a frequency of $Qf_{r2}$ are selected when the currently set $f_{r1}$ and $f_{r2}$ cannot ensure that the secondary mixing coarse measurement signals and the $N^{th}$ order inter-mode self-interference fine measurement signals of a first optical frequency comb satisfy the inter-stage transition condition. An inter-mode self-interference secondary mixing signal with a frequency of $|Pf_{r1} - Qf_{r2}|$ is used as an intermediate transition measurement scale to satisfy an inter-stage transition condition of a coarse measurement scale and the intermediate transition measurement scale. Where a formula of the inter-stage transition condition of the coarse measurement scale and the intermediate transition measurement scale is expressed as follows:

$$U(L_{coarse}) < \frac{\lambda_{middle}}{4} = \frac{c}{4n|Pf_{r1} - Qf_{r2}|} = \frac{c \cdot |Nf_{r1} - Mf_{r2}|}{4|n_1 N f_{r1} - n_2 M f_{r2}| \cdot |Pf_{r1} - Qf_{r2}|};$$

where $\lambda_{middle}$ represents a wavelength of the inter-mode self-interference secondary mixing signal with the frequency of $|Pf_{r1} - Qf_{r2}|$.

The step 2 to the step 5 are performed to measure a phase difference $\varphi_{middle0}$ between the measurement end and the reference end of the inter-mode self-interference secondary mixing signal with the frequency of $|Pf_{r1} - Qf_{r2}|$ at the zero position and a phase difference $\varphi_{middle}$ between the measurement end and the reference end of the inter-mode self-interference secondary mixing signal with the frequency of $|Pf_{r1} - Qf_{r2}|$ at the position of the to-be-measured distance L, and a distance measurement result of the intermediate transition measurement scale is calculated by using a formula expressed as follows:

$$L_{middle} = \frac{\varphi_{middle} - \varphi_{middle0}}{2\pi} \cdot \frac{c \cdot |Nf_{r1} - Mf_{r2}|}{2|n_1Nf_{r1} - n_2Mf_{r2}| \cdot |Pf_{r1} - Qf_{r2}|}.$$

The intermediate transition measurement scale is made to satisfy an inter-stage transition condition of the intermediate transition measurement scale and a fine measurement scale, where a formula of the inter-stage transition condition of the intermediate transition measurement scale and the fine measurement scale is expressed as follows:

$$U(L_{middle}) < \frac{\lambda_{fine}}{4} = \frac{c}{4n_1Nf_{r1}}.$$

The $P^{th}$ order inter-mode self-interference signal of the first optical frequency comb and the $Q^{th}$ order inter-mode self-interference signal of the second optical frequency comb are selected to take the inter-mode self-interference secondary mixing signal with the frequency of $|Pf_{r1}-Qf_{r2}|$ as the intermediate transition measurement scale to satisfy the inter-stage transition condition of the coarse measurement scale and the intermediate transition measurement scale and the inter-stage transition condition of the intermediate transition measurement scale and the fine measurement scale, to thereby achieve accuracy transmission among the coarse measurement scale, the intermediate transition measurement scale and the fine measurement scale.

In step 7, an inter-mode self-interference secondary mixing signal with a frequency of $f_{2nd}$ is used as a coarse measurement scale to calculate a corresponding coarse measurement distance $L_{coarse0}$, and the inter-mode self-interference secondary mixing signal with the frequency of $|Pf_{r1}-Qf_{r2}|$ is used as the intermediate transition measurement scale to calculate a corresponding intermediate distance $L_{middle}$ after the intermediate transition measurement scale satisfies the inter-stage transition condition of the coarse measurement scale and the intermediate transition measurement scale and the inter-stage transition condition of the intermediate transition measurement scale and the fine measurement scale. The coarse measurement distance $L_{coarse0}$ and the intermediate distance $L_{middle}$ are substituted into the formula of the step 5 to obtain a transition distance, and the transition distance is recorded as $L_{coarse-new}$; where a formula for calculating the transition distance $L_{coarse-new}$ is expressed as follows:

$$L_{coarse-new} = L_{middle} + \frac{c}{2n|Pf_{r1} - Qf_{r2}|} \cdot \text{floor}\left[\frac{2n|Pf_{r1} - Qf_{r2}|(L_{coarse0} - L_{middle})}{c} + \frac{1}{2}\right].$$

An inter-mode self-interference signal with a frequency of $Nf_{r1}$ is used as a fine measurement scale to calculate the fine measurement distance $L_{fine}$. The transition distance $L_{coarse-new}$ and the fine measurement distance $L_{fine}$ are substituted into the formula of the step 5 to obtain the to-be-measured distance L; where a formula of the to-be-measured distance L is expressed as follows:

$$L = L_{fine} + \frac{c}{2n_1Nf_{r1}} \cdot \text{floor}\left[\frac{2n_1Nf_{r1}(L_{coarse-new} - L_{fine})}{c} + \frac{1}{2}\right].$$

The disclosure provides an electronic device, and the electronic device includes a memory and a processor. The memory is configured to store a computer program, and the processor is configured to execute the computer program to achieve steps of the distance measurement method based on secondary mixing of inter-mode self-interference signals of optical frequency combs.

The disclosure provides a computer readable storage medium for storing a computer instruction, and the computer instruction is configured to be executed by a processor to achieve the steps of the above distance measurement method based on secondary mixing of inter-mode self-interference signals of optical frequency combs.

The technical solutions of the disclosure are described through a specific embodiment below.

Figure 2:
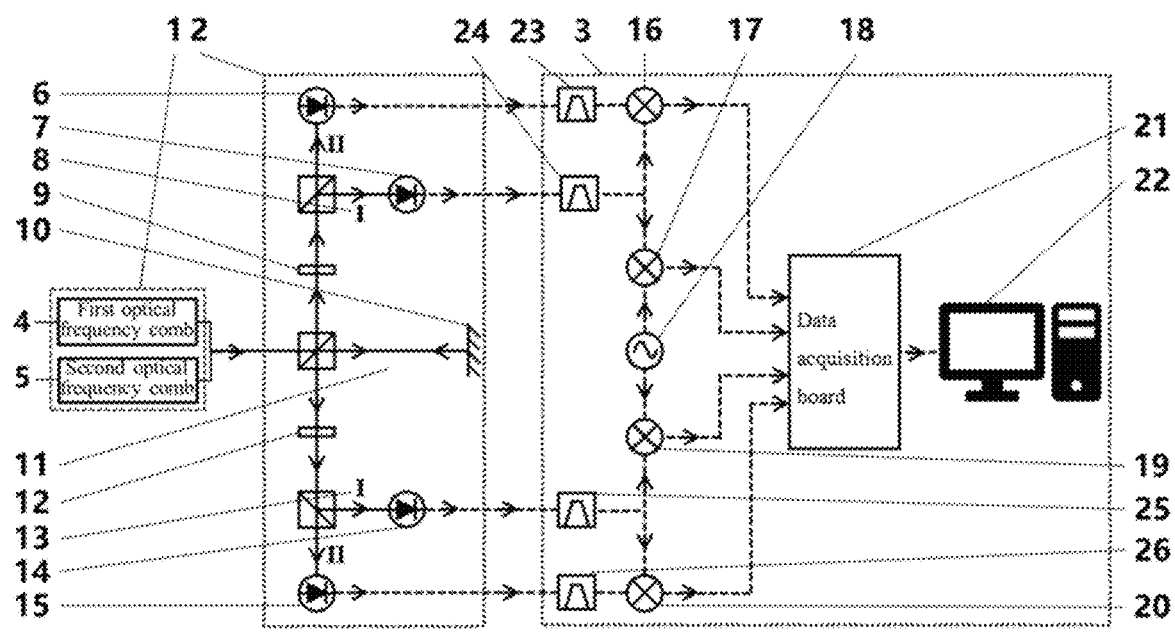
FIG. 2 illustrates a schematic diagram of a specific implementation method of the distance measurement device based on secondary mixing of inter-mode self-interference signals of optical frequency combs according to an embodiment of the disclosure.
Figure 3:
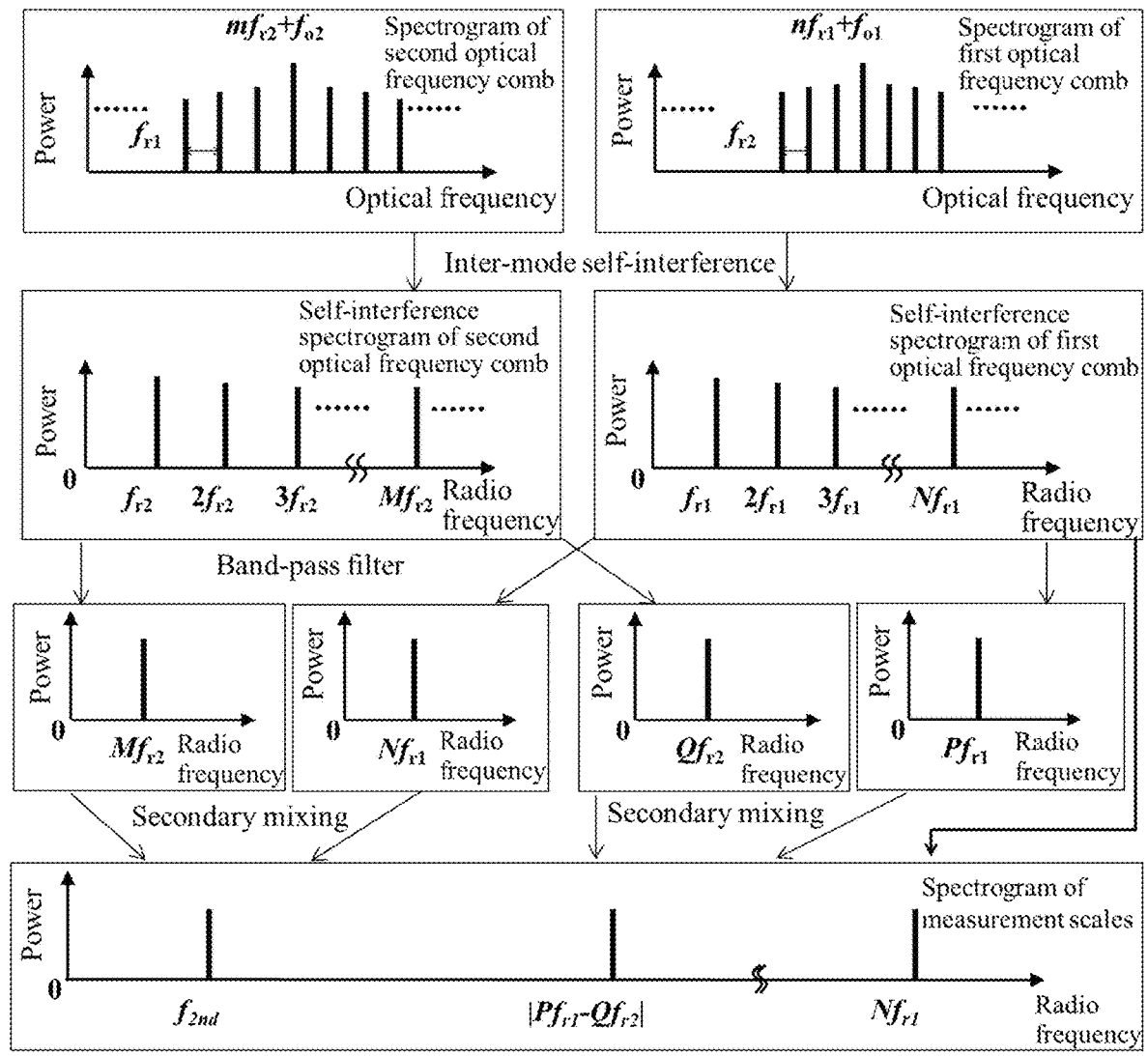
FIG. 3 illustrates a spectrum diagram of a generation principle of inter-mode self-interference secondary mixing signals of optical frequency combs according to an embodiment of the disclosure.

FIG. 2 and FIG. 3 are combined to describe the distance measurement device based on secondary mixing of inter-mode self-interference signals of optical frequency combs in the embodiment, and the distance measurement device mainly includes: a dual-comb light source 1, a detection optical module 2 of the inter-mode self-interference signals of the optical frequency combs and a generation, acquisition and calculation module 3 of inter-mode self-interference secondary mixing signals of the optical frequency combs. The dual-comb light source 1 is configured to emit a dual-comb laser into the detection optical module 2 to obtain inter-mode self-interference signals of the optical frequency combs carrying to-be-measured distance information. The detection optical module 2 is configured to transmit the inter-mode self-interference signals of the optical frequency combs to the generation, acquisition and calculation module 3 to generate the inter-mode self-interference secondary mixing signals of the optical frequency combs, to thereby achieve data acquisition and obtain a distance measurement result.

The dual-comb light source 1 includes: a first optical frequency comb laser 4 and a second optical frequency comb laser 5. A repetition rate of the first optical frequency comb laser 4 is locked to $f_{r1}$=100 MHz, and a repetition rate of the second optical frequency comb laser 5 is locked to $f_{r2}$=250.0025 MHz. Offset frequencies of a first optical frequency comb and a second optical frequency comb are unlocked.

The inter-mode self-interference signals of the optical frequency combs include: $N^{th}$=100th order inter-mode self-interference signals of the first optical frequency comb and $M^{th}$=$40^{th}$ order inter-mode self-interference signals of the second optical frequency comb. The $100^{th}$ order inter-mode self-interference signal of the first optical frequency comb is the signal generated by beat frequency interference between paired longitudinal modes with a frequency interval of $Nf_{r1}$=10 GHz in comb modes of the first optical frequency comb. The $40^{th}$ order inter-mode self-interference signal of the second optical frequency comb is the signal generated by beat frequency interference between paired longitudinal modes with a frequency interval of $Mf_{r2}$=10.0001 GHz in comb modes of the second optical frequency comb. The $N^{th}$ order inter-mode self-interference signals of the first optical frequency comb are configured for fine distance measurement. A value of the positive integer N is determined by a measurement accuracy requirement, and the higher frequency interval $Nf_{r1}$, the higher the measurement accuracy.

The inter-mode self-interference secondary mixing signal of the optical frequency combs is the signal generated by secondary mixing between the $100^{th}$ order inter-mode self-interference signal of the first optical frequency comb and the $40^{th}$ order inter-mode self-interference signal of the second optical frequency comb. A frequency $f_{2nd}$ of the inter-mode self-interference secondary mixing signals is a frequency difference of the inter-mode self-interference signals, and the frequency $f_{2nd}$ is expressed as $f_{2nd}=|Nf_{r1}-Mf_{r2}|=0.1$ MHz. A measurement unambiguous range of phase corresponding to the frequency $f_{2nd}$ is expressed as $$L_{NAR} = \frac{c}{2nf_{2nd}} = 1.5 \text{ km},$$

c represents the speed of light in vacuum, and n represents the equivalent refractive index of the inter-mode self-interference secondary mixing signals. A value of n is $$n = \frac{|n_1 N f_{r1} - n_2 M f_{r2}|}{f_{2nd}},$$

$n_1$ represents the group refractive index of the first optical frequency comb, and $n_2$ represents the group refractive index of the second optical frequency comb. In vacuum, n=1. The inter-mode self-interference secondary mixing signals of the optical frequency combs are configured for coarse distance measurement, and the frequency $f_{2nd}$ should satisfy an inter-stage transition condition. A value of the positive integer M is determined by the measurement unambiguous range and the frequency interval $Nf_{r1}$, and the lower the frequency $f_{2nd}$, the lager the measurement unambiguous range.

The detection optical module 2 includes: a detector 6 for the second optical frequency comb at a reference end, a detector 7 for the first optical frequency comb at the reference end, a polarizing beam splitter 8 at the reference end, a half-wave plate 9 at the reference end, a target reflector 10, a 50/50 beam splitter 11, a half-wave plate 12 at a measurement end, a polarizing beam splitter 13 at the measurement end, a detector 14 for the first optical frequency comb at the measurement end and a detector 15 for the second optical frequency comb at the measurement end. In the laser emitted from the dual-comb light source, the first optical frequency comb and the second optical frequency comb are linearly polarized light and have mutually orthogonal polarization directions. The first optical frequency comb emitted by the dual-comb light source 1 is reflected and transmitted at the 50/50 beam splitter 11, the reflected light of the first frequency comb is reflected at the polarizing beam splitter 8 at the reference end after passing through the half-wave plate 9 at the reference end, and the first optical frequency comb is illuminated on the detector 7 for the first optical frequency comb at the reference end after reflecting. The transmitted light of the first frequency comb obtained at the 50/50 beam splitter 11 is reflected at the target reflector 10, the reflected light of the first optical frequency comb obtained at the target reflector 10 returns to the 50/50 beam splitter 11 to be reflected and transmitted, then the reflected light of the first optical frequency comb is reflected at the polarizing beam splitter 13 at the measurement end after passing through the half-wave plate 12 at the measurement end, and the first optical frequency comb is illuminated on the detector 14 for the first optical frequency comb at the measurement end after reflecting. The second optical frequency comb emitted by the dual-comb light source 1 is reflected and transmitted at the 50/50 beam splitter 11, the reflected light of the second frequency comb is transmitted at the polarizing beam splitter 8 at the reference end after passing through the half-wave plate 9 at the reference end, and the second optical frequency comb is illuminated on the detector 6 for the second optical frequency comb at the reference end after transmitting. The transmitted light of the second optical frequency comb obtained at the 50/50 beam splitter 11 is reflected at the target reflector 10, the reflected light of the second optical frequency comb obtained at the target reflector 10 returns to the 50/50 beam splitter 11 to be reflected and transmitted, then the reflected light of the second optical frequency comb is transmitted at the polarizing beam splitter 13 at the measurement end after passing through the half-wave plate 12 at the measurement end, and the second optical frequency comb is illuminated on the detector 15 for the second optical frequency comb at the measurement end after transmitting.

The generation, acquisition and calculation module 3 includes: a coarse measurement signal generating mixer 16 at the reference end, a fine measurement signal generating mixer 17 at the reference end, a local oscillator 18, a fine measurement signal generating mixer 19 at the measurement end, a coarse measurement signal generating mixer 20 at the measurement end, a data acquisition card 21, an upper computer 22, a coarse measurement signal generating wave filter 23 at the reference end, a fine measurement signal generating wave filter 24 at the reference end, a fine measurement signal generating wave filter 25 at the measurement end and a coarse measurement signal generating wave filter 26 at the measurement end. The $100^{th}$ order inter-mode self-interference signal of the first optical frequency comb generated at the detector 7 for the first optical frequency comb at the reference end is divided into two paths. One path of the $100^{th}$ order inter-mode self-interference signal at the reference end after filtering out irrelevant frequency components by the fine measurement signal generating wave filter 24 at the reference end performs, at the coarse measurement signal generating mixer 16 at the reference end, secondary mixing with the $40^{th}$ order inter-mode self-interference signal of the second optical frequency comb generated at the detector 6 for the second optical frequency comb at the reference end and filtered out irrelevant frequency components by the coarse measurement signal generating wave filter 23 at the reference end to generate a middle frequency signal (i.e., the secondary mixing coarse measurement signal with the longest measurement scale at the reference end). The other path of the $100^{th}$ order inter-mode self-interference signal at the reference end after filtering out irrelevant frequency components by the fine measurement signal generating wave filter 24 at the reference end performs, at the fine measurement signal generating mixer 17 at the reference end, mixing with a local oscillator signal emitted by the local oscillator 18 to generate a middle frequency signal (i.e., mixing fine measurement signal at the reference end). The $100^{th}$ order inter-mode self-interference signal of the first optical frequency comb generated at the detector 14 for the first optical frequency comb at the measurement end is divided into two paths. One path of the $100^{th}$ order inter-mode self-interference signal at the measurement end after filtering out irrelevant frequency components by the fine measurement signal generating wave filter 25 at the measurement end performs, at the coarse measurement signal generating mixer 20 at the measurement end, secondary mixing with the $40^{th}$ order inter-mode self-interference signal of the second optical frequency comb generated at the detector 15 for the second optical frequency comb at the measurement end and filtered out irrelevant frequency components by the coarse measurement signal generating wave filter 26 at the measurement end to generate a middle frequency signal (i.e., the secondary mixing coarse measurement signal with the longest measurement scale at the measurement end). The other path of the 100$^{th}$ order inter-mode self-interference signal at the measurement end after filtering out irrelevant frequency components by the fine measurement signal generating wave filter 25 at the measurement end performs, at the fine measurement signal generating mixer 19 at the measurement end, mixing with a local oscillator signal emitted by the local oscillator 18 to generate a middle frequency signal (i.e., mixing fine measurement signal at the measurement end). The four middle frequency signals are transmitted to different acquisition channels of the data acquisition card 21, respectively, to obtain acquired data, and the acquired data is transmitted to the upper computer 22 to perform coarse and fine calculation of phase and to-be-measure distance.

A distance measurement method based on secondary mixing of inter-mode self-interference signals of optical frequency combs, achieved by the distance measurement device based on secondary mixing of inter-mode self-interference signals of optical frequency combs is provided, and the method includes the following step 1-7.

In step 1, the dual-comb light-source 1 is started. Repetition rates $f_{r1}$=100 MHz and $f_{r2}$=250.0025 MHz of dual combs are set to make a to-be-measured distance/not exceed a half of the measurement unambiguous range $L_{NAR}$, and to make frequencies of the middle frequency signals respectively generated at the coarse measurement signal generating mixer 16 at the reference end and the coarse measurement signal generating mixer 20 at the measurement end be low enough to be acquired by the data acquisition card 21. The local oscillator 18 is started to emit a local oscillator signal with a frequency of $f_{LO}$. The frequency of $f_{LO}$=10.0002 GHz is set to make frequencies of the middle frequency signals respectively generated at the fine measurement signal generating mixer 17 at the reference end and a fine measurement signal generating mixer 19 at the measurement end be 0.2 MHz, and is enough to be acquired by the data acquisition card 21.

In step 2, the target reflector 10 is placed at a zero position. The data acquisition card 21 and the upper computer 22 are used to acquire and calculate the middle frequency signals respectively generated at the fine measurement signal generating mixer 17 at the reference end and the fine measurement signal generating mixer 19 at the measurement end to obtain a first fine phase difference $\varphi_{fine0}$ between the measurement end and the reference end. The data acquisition card 21 and the upper computer 22 are used to acquire and calculate the middle frequency signals respectively generated at the coarse measurement signal generating mixer 16 at the reference end and the coarse measurement signal generating mixer 20 at the measurement end to obtain a first coarse phase difference $\varphi_{coarse0}$ between the measurement end and the reference end.

In step 3, the target reflector 10 is moved to a position of the to-be-measured distance L. The data acquisition card 21 and the upper computer 22 are used to acquire and calculate the middle frequency signals respectively generated at the fine measurement signal generating mixer 17 at the reference end and the fine measurement signal generating mixer 19 at the measurement end to obtain a second fine phase difference $\varphi_{fine}$ between the measurement end and the reference end. The data acquisition card 21 and the upper computer 22 are used to acquire and calculate the middle frequency signals respectively generated at the coarse measurement signal generating mixer 16 at the reference end and the coarse measurement signal generating mixer 20 at the measurement end to obtain a second coarse phase difference $\varphi_{coarse}$ between the measurement end and the reference end.

In step 4, the upper computer 22 is used to calculate a fine measurement distance $L_{fine}$ by using the first fine phase difference $\varphi_{fine0}$ and the second fine phase difference $\varphi_{fine}$ between the measurement end and the reference end when the target reflector 10 is placed at the zero position, and the upper computer 22 is used to calculate a coarse measurement distance $L_{coarse}$ by using the first coarse phase difference $\varphi_{coarse0}$ and the second coarse phase difference $\varphi_{coarse}$ when the target reflector 10 is moved to the position of the to-be-measured distance L. The calculation formula is expressed as follows:

$$L_{fine} = \frac{\varphi_{fine} - \varphi_{fine0}}{2\pi} \cdot \frac{c}{2n_1 N f_{r1}};$$

$$L_{coarse} = \frac{\varphi_{coarse} - \varphi_{coarse0}}{2\pi} \cdot \frac{c}{2|n_1 N f_{r1} - n_2 M f_{r2}|}.$$

In step 5, the upper computer 22 is used to calculate the to-be-measured distance L according to the fine measurement distance $L_{fine}$ and the coarse measurement distance $L_{coarse}$. The calculation formula is expressed as follows:

$$L = L_{fine} + \frac{c}{2n_1 N f_{r1}} \cdot \text{floor}\left[\frac{2n_1 N f_{r1}(L_{coarse} - L_{fine})}{c} + \frac{1}{2}\right];$$

where floor[ ] represents rounding down or rounding off. A prerequisite for establishment of the calculation formula of the to-be-measured distance L is to satisfy an inter-stage transition condition.

In step 6, the inter-stage transition condition is used to determine whether the calculation formula of the to-be-measured distance L is established; where a formula of the inter-stage transition condition is expressed as follows:

$$U(L_{coarse}) < \frac{\lambda_{fine}}{4} = \frac{c}{4n_1 N f_{r1}};$$

where $U(L_{coarse})$ represents a coarse measurement uncertainty, and $\lambda_{fine}$ represents a fine measurement scale.

A P$^{th}$ order inter-mode self-interference signal of the first optical frequency comb with a frequency of $Pf_{r1}$ and a Q$^{th}$ order inter-mode self-interference signal of the second optical frequency comb with a frequency of $Qf_{r2}$ are selected when the currently set $f_{r1}$ and $f_{r2}$ cannot ensure that the secondary mixing coarse measurement signals and the N$^{th}$ order inter-mode self-interference fine measurement signals of a first optical frequency comb satisfy the inter-stage transition condition. An inter-mode self-interference secondary mixing signal with a frequency of $|Pf_{r1} - Qf_{r2}|$ is used as an intermediate transition measurement scale to satisfy an inter-stage transition condition of a coarse measurement scale and the intermediate transition measurement scale. Where a formula of the inter-stage transition condition of the coarse measurement scale and the intermediate transition measurement scale is expressed as follows:

$$U(L_{coarse}) < \frac{\lambda_{middle}}{4} = \frac{c}{4n|Pf_{r1} - Qf_{r2}|} = \frac{c \cdot |Nf_{r1} - Mf_{r2}|}{4|n_1 N f_{r1} - n_2 M f_{r2}| \cdot |Pf_{r1} - Qf_{r2}|};$$

where $\lambda_{middle}$ represents a wavelength of the inter-mode self-interference secondary mixing signal with the frequency of $|Pf_{r1}-Qf_{r2}|$.

The step 2 to the step 5 are performed to measure a phase difference $\varphi_{middle0}$ between the measurement end and the reference end of the inter-mode self-interference secondary mixing signal with the frequency of $|Pf_{r1}-Qf_{r2}|$ at the zero position and a phase difference $\varphi_{middle}$ between the measurement end and the reference end of the inter-mode self-interference secondary mixing signal with the frequency of $|Pf_{r1}-Qf_{r2}|$ at the position of the to-be-measured distance L, and a distance measurement result of the intermediate transition measurement scale is calculated by using a formula expressed as follows:

$$L_{middle} = \frac{\varphi_{middle} - \varphi_{middle0}}{2\pi} \cdot \frac{c \cdot |Nf_{r1} - Mf_{r2}|}{2|n_1 Nf_{r1} - n_2 Mf_{r2}| \cdot |Pf_{r1} - Qf_{r2}|}.$$

The intermediate transition measurement scale is made to satisfy an inter-stage transition condition of the intermediate transition measurement scale and a fine measurement scale, where a formula of the inter-stage transition condition of the intermediate transition measurement scale and the fine measurement scale is expressed as follows:

$$U(L_{middle}) < \frac{\lambda_{fine}}{4} = \frac{c}{4n_1 Nf_{r1}}.$$

The $P^{th}$ order inter-mode self-interference signal of the first optical frequency comb and the $Q^{th}$ order inter-mode self-interference signal of the second optical frequency comb are selected to take the inter-mode self-interference secondary mixing signal with the frequency of $|Pf_{r1}-Qf_{r2}|$ as the intermediate transition measurement scale to satisfy the inter-stage transition condition of the coarse measurement scale and the intermediate transition measurement scale and the inter-stage transition condition of the intermediate transition measurement scale and the fine measurement scale, to thereby achieve accuracy transmission among the coarse measurement scale, the intermediate transition measurement scale and the fine measurement scale.

In step 7, an inter-mode self-interference secondary mixing signal with a frequency of $f_{2nd}$ is used as a coarse measurement scale to calculate a corresponding coarse measurement distance $L_{coarse0}$, and the inter-mode self-interference secondary mixing signal with the frequency of $|Pf_{r1}-Qf_{r2}|$ is used as the intermediate transition measurement scale to calculate a corresponding intermediate distance $L_{middle}$ after the intermediate transition measurement scale satisfies the inter-stage transition condition of the coarse measurement scale and the intermediate transition measurement scale and the inter-stage transition condition of the intermediate transition measurement scale and the fine measurement scale. The coarse measurement distance $L_{coarse0}$ and the intermediate distance $L_{middle}$ are substituted into the formula of the step 5 to obtain a transition distance, and the transition distance is recorded as $L_{coarse-new}$; where a formula for calculating the transition distance $L_{coarse-new}$ is expressed as follows:

$$L_{coarse-new} = L_{middle} + \frac{c}{2n|Pf_{r1} - Qf_{r2}|} \cdot \text{floor}\left[\frac{2n|Pf_{r1} - Qf_{r2}|(L_{coarse0} - L_{middle})}{c} + \frac{1}{2}\right].$$

An inter-mode self-interference signal with a frequency of $Nf_{r1}$ is used as a fine measurement scale to calculate the fine measurement distance $L_{fine}$. The transition distance $L_{coarse-new}$ and the fine measurement distance $L_{fine}$ are substituted into the formula of the step 5 to obtain the to-be-measured distance L; where a formula of the to-be-measured distance L is expressed as follows:

$$L = L_{fine} + \frac{c}{2n_1 Nf_{r1}} \cdot \text{floor}\left[\frac{2n_1 Nf_{r1}(L_{coarse-new} - L_{fine})}{c} + \frac{1}{2}\right].$$

According to the above steps, when the repetition rates $f_{r1}=100$ MHz and $f_{r2}=250.0025$ MHz of the dual combs are set, the frequency of the inter-mode self-interference secondary mixing signals of the optical frequency combs generated by the $100^{th}$ order inter-mode self-interference signals of the first optical frequency comb and the $40^{th}$ order inter-mode self-interference signals of the second optical frequency comb can be calculated as $f_{2nd}=|Nf_{r1}-Mf_{r2}|=0.1$ MHz, and the measurement unambiguous range of phase corresponding to the frequency $f_{2nd}$ is expressed as $$L_{NAR} = \frac{c}{2nf_{2nd}} = 1.5 \text{ km}.$$

A fine measurement accuracy corresponding to the inter-mode self-interference signal with the frequency of $Nf_{r1}=10$ GHz is calculated as 1.04 microns (μm) according to a phase measurement uncertainty in the experiment $U(\varphi)=0.05°$ and a formula $$L_{fine} = \frac{\varphi_{fine} - \varphi_{fine0}}{2\pi} \cdot \frac{c}{2n_1 Nf_{r1}}.$$

Meanwhile, whether the selected $100^{th}$ order inter-mode self-interference signal of the first optical frequency comb and the $40^{th}$ order inter-mode self-interference signal of the second optical frequency comb in the embodiment satisfy the inter-stage transition condition is determined. In the embodiment, $U(L_{coarse})=0.208$ m, and $$\frac{\lambda_{fine}}{4} = \frac{c}{4n_1 Nf_{r1}} = 0.0075 \text{ m},$$

which do not satisfy the inter-stage transition condition, and the intermediate transition measurement scale described in the step 6 and step 7 needs to be used. P=101, and Q=40 are selected, a frequency of the intermediate transition measurement scale is $|Pf_{r1}-Qf_{r2}|=99.9$ MHz, and whether the $100^{th}$ order inter-mode self-interference signal of the first optical frequency comb and the $40^{th}$ order inter-mode self-interference signal of the second optical frequency comb in the embodiment satisfy the inter-stage transition condition of the coarse measurement scale and the intermediate transition measurement scale is determined according to the following formula:

$$U(L_{coarse}) = 0.208 \text{ m} < \frac{\lambda_{middle}}{4} = 0.7507 \text{ m}.$$

The inter-stage transition condition of the intermediate transition measurement scale and the fine measurement scale is expressed as follows:

$$U(L_{middle}) = 0.000208 \text{ m} < \frac{\lambda_{fine}}{4} = 0.0075 \text{ m}.$$

When the inter-stage transition conditions are satisfied, indicating that the disclosure can solve the problem of current inter-mode self-interference distance measurement of the optical frequency combs, which is difficult to balance the unambiguous range of hundreds of meters to several kilometers, as well as the accuracy of ten micrometers or even micrometers.

FIG. 2 illustrates a schematic diagram of a specific implementation method of the distance measurement device based on secondary mixing of inter-mode self-interference signals of optical frequency combs according to an embodiment of the disclosure. Compared to FIG. 1, a coarse measurement signal generating wave filter 23 at the reference end, a fine measurement signal generating wave filter 24 at the reference end, a fine measurement signal generating wave filter 25 at the measurement end and a coarse measurement signal generating wave filter 26 at the measurement end are added to the distance measurement device illustrated in FIG. 2, so that the disclosure is more easily to be implemented in the embodiment.

FIG. 3 illustrates a spectrum diagram of a generation principle of the inter-mode self-interference secondary mixing signals of the optical frequency combs according to an embodiment of the disclosure. The dual-comb light source individually generates the first optical frequency comb with a frequency component $nf_{r1}+f_{o1}$ and the second optical frequency comb with a frequency component $mf_{r2}+f_{o2}$, $f_{o1}$ and $f_{o2}$ are respectively offset frequencies of the first optical frequency comb and the second optical frequency comb, and do not need to be locked, which has no effect on the distance measurement result, and spectrograms of the first optical frequency comb and the second optical frequency comb are shown in FIG. 3. The first optical frequency comb and the second optical frequency comb performs inter-mode self-interference to generate the inter-mode self-interference signals of the optical frequency combs, and self-interference spectrograms of the first optical frequency comb and the second optical frequency comb are shown in FIG. 3. The inter-mode self-interference signals of the optical frequency combs pass through a photodetector and a specific bandpass filter to obtain a signal with a frequency component of $Nf_{r1}$ and a signal with a frequency component of $Mf_{r2}$, respectively, and the secondary mixing is performed on the signal with the frequency component of $Nf_{r1}$ and the signal with the frequency component of $Mf_{r2}$ to obtain the inter-mode self-interference secondary mixing signal with a frequency of $f_{2nd}=|Nf_{r1}-Mf_{r2}|$, and the inter-mode self-interference secondary mixing signal with a frequency of $f_{2nd}=|Nf_{r1}-Mf_{r2}|$ is used as the coarse measurement scale. Meanwhile, the coefficients P and Q are selected from the self-interference spectrograms of the first optical frequency comb and the second optical frequency comb, the secondary mixing is performed on the coefficients P and Q to obtain the inter-mode self-interference secondary mixing signal with a frequency of $|Pf_{r1}-Qf_{r2}|$, and the inter-mode self-interference secondary mixing signal with the frequency of $|Pf_{r1}-Qf_{r2}|$ is used as the intermediate transition measurement scale. Finally, the $N^{th}$ order inter-mode self-interference signal in the first optical frequency comb is used as the fine measurement scale, and a measurement scale spectrogram of the coarse measurement scale, the intermediate transition measurement scale and fine measurement scale is shown in FIG. 3.

The memory in the embodiments of the disclosure can be a transitory memory or a non-transitory memory, or includes both the transitory memory and the non-transitory memory. The non-transitory memory can be a read only memory (ROM), a programmable ROM (PROM), an erasable PROM (EPROM), an electrically EPROM (EEPROM) or a flash memory. The transitory memory can be a random access memory (RAM), which is used for external cache. Through an exemplary but not limiting description that multiple forms of RAM are available, for example, a static RAM (SRAM), a dynamic RAM (DRAM), a synchronous DRAM (SDRAM), a double data rate SDRAM (DDR SDRAM), an enhance SDRAM (ESDRAM), a synchlink DRAM (SLDRAM) and a direct rambus RAM (DR RAM). It should be noted that the memory of the method described in the disclosure is intended to include, but is not limited to, these and any other suitable types of memories.

In the above embodiments, the embodiments can be implemented in whole or in part by software, hardware, firmware or any combination thereof. It can be fully or partially implemented in the form of a computer program product when implemented in software. The computer program product includes one or more computer instructions. When the computer instructions are loaded and executed on a computer, the flow or function described in the embodiments of the disclosure is generated in whole or in part. The computer can be a general-purpose computer, a special-purpose computer, a computer network, or other programmable devices. The computer instructions can be stored in a computer readable storage medium, or be transmitted from one computer readable storage medium to another computer readable storage medium. For example, the computer instructions can be transmitted from a web site, a computer, a server or a data center to another web site, another computer, another server or another data center through a wired way (e.g., a coaxial cable, an optical fiber, a digital subscriber line abbreviated as DSL) or a wireless way (e.g., infrared, wireless, microwave, etc.). The computer readable storage medium can be any available medium that the computer can access, or a data storage device such as a server, data center, etc. that integrates one or more available media. The available medium can be a magnetic medium (e.g., a floppy disk, a hard disk and a magnetic tape), an optical medium (e.g., a digital video disc abbreviated as DVD) or a semiconductor medium (e.g., a solid-state disc abbreviated as SSD).

In the implementation process, each step of the above method can be completed through an integrated logic circuit of the hardware in the processor or instructions in the form of the software. The steps of the method disclosed in the embodiments of the disclosure can be directly reflected in the completion of hardware processor execution, or the completion of execution by combining hardware and software modules in the processor. The software module may be located in a mature storage medium in the art, such as RAM, a flash memory, a ROM, a PROM, an EEPROM, a register and the like. The storage medium is located at the memory, the processor reads information in the memory, and combines the hardware to complete the steps of the above method. To avoid repetition, there is not provide a detailed description.

It should be noted that the processor in the embodiments of the disclosure may be an integrated circuit chip with signal processing capabilities. In the implementation process, each step of the above method can be completed through an integrated logic circuit of the hardware in the processor or instructions in the form of the software. The above processor can be a general-purpose processor, a digital signal processor (DSP), a specialized integrated circuit (ASIC), a field programmable gate array (FPGA) or other programmable logic devices, a discrete gate or a transistor logic device, and a discrete hardware component. The processor can implement or execute the method, the steps, and logical diagrams in the embodiments of the disclosure. The general-purpose processor can be a microprocessor, or it can be any conventional processor. The steps of the method disclosed in the embodiments of the disclosure can be directly reflected in the completion of the hardware decoding processor execution, or the completion of the combination of hardware and software modules in the decoding processor execution. The software module may be located in the mature storage medium in the art, such as the RAM, the flash memory, the ROM, the PROM, the EEPROM, the register and the like. The storage medium is located at the memory, the processor reads information in the memory, and combines the hardware to complete the steps of the above method. To avoid repetition, there is not provide a detailed description.

The above is a detail description of the distance measurement device and method based on secondary mixing of inter-mode self-interference signals of optical frequency combs proposed by the disclosure, the disclosure applies specific embodiments to describe the principle and embodiments of the disclosure, and the above description of the embodiments are only used to assist in understanding the method and the core idea of the disclosure. Meanwhile, for those skilled in the art, there may be changes in specific implementation methods and application scope based on the ideas of the disclosure. In summary, the content of the specification should not be understood as a limitation of the disclosure.

What is claimed is:

1. A distance measurement method based on secondary mixing of inter-mode self-interference signals of optical frequency combs, comprising:

step 1, starting a dual-comb light source (1), and setting repetition rates $f_{r1}$ and $f_{r2}$ of dual combs to make a to-be-measured distance/not exceed a half of a measurement unambiguous range $L_{NAR}$, and to make frequencies of secondary mixing coarse measurement signals respectively generated at a coarse measurement signal generating mixer (16) at a reference end of an interferometer and a coarse measurement signal generating mixer (20) at a measurement end of the interferometer lower than a half of an acquisition frequency of a data acquisition card (21); and starting a local oscillator (18) to emit a local oscillator signal with a frequency of $f_{Lo}$, and setting the frequency $f_{Lo}$ to make frequencies of mixing fine measurement signals respectively generated at a fine measurement signal generating mixer (17) at the reference end and a fine measurement signal generating mixer (19) at the measurement end lower than the half of the acquisition frequency of the data acquisition card (21);

step 2, placing a target reflector (10) at a zero position; acquiring and calculating, by using the data acquisition card (21) and an upper computer (22), the mixing fine measurement signals respectively generated at the fine measurement signal generating mixer (17) at the reference end and the fine measurement signal generating mixer (19) at the measurement end to obtain a first fine phase difference $\varphi_{fine0}$ between the measurement end and the reference end; and acquiring and calculating, by using the data acquisition card (21) and the upper computer (22), the secondary mixing coarse measurement signals respectively generated at the coarse measurement signal generating mixer (16) at the reference end and the coarse measurement signal generating mixer (20) at the measurement end to obtain a first coarse phase difference $\varphi_{coarse0}$ between the measurement end and the reference end;

step 3, moving the target reflector (10) to a position of the to-be-measured distance L; acquiring and calculating, by using the data acquisition card (21) and the upper computer (22), the mixing fine measurement signals respectively generated at the fine measurement signal generating mixer (17) at the reference end and the fine measurement signal generating mixer (19) at the measurement end to obtain a second fine phase difference $\varphi_{fine}$ between the measurement end and the reference end; and acquiring and calculating, by using the data acquisition card (21) and the upper computer (22), the secondary mixing coarse measurement signals respectively generated at the coarse measurement signal generating mixer (16) at the reference end and the coarse measurement signal generating mixer (20) at the measurement end to obtain a second coarse phase difference $\varphi_{coarse}$ between the measurement end and the reference end;

step 4, calculating a fine measurement distance $L_{fine}$ and a coarse measurement distance $L_{coarse}$, wherein calculation formulas of the fine measurement distance $L_{fine}$ and the coarse measurement distance $L_{coarse}$ are expressed as follows:

$$L_{fine} = \frac{\varphi_{fine} - \varphi_{fine0}}{2\pi} \cdot \frac{c}{2n_1 N f_{r1}};$$

$$L_{coarse} = \frac{\varphi_{coarse} - \varphi_{coarse0}}{2\pi} \cdot \frac{c}{2|n_1 N f_{r1} - n_2 M f_{r2}|};$$

wherein N represents an order number of a $N^{th}$ order repetition rate component of inter-mode self-interference signals of the first optical frequency comb, M represents an order number of a $M^{th}$ order repetition rate component of inter-mode self-interference signals of the second optical frequency comb, c represents a speed of light in vacuum, $n_1$ represents a group refractive index of the first optical frequency comb, and $n_2$ represents a group refractive index of the second optical frequency comb;

step 5, calculating the to-be-measured distance L, wherein a calculation formula of the to-be-measured distance L is expressed as follows:

$$L = L_{fine} + \frac{c}{2n_1 N f_{r1}} \cdot \text{floor}\left[\frac{2n_1 N f_{r1}(L_{coarse} - L_{fine})}{c} + \frac{1}{2}\right];$$

wherein floor[ ] represents rounding down, and a prerequisite for establishment of the calculation formula of the to-be-measured distance L satisfies an inter-stage transition condition;

step 6, determining, by using the inter-stage transition condition, whether the calculation formula of the to-be-measured distance L is established; wherein a formula of the inter-stage transition condition is expressed as follows:

$$U(L_{coarse}) < \frac{\lambda_{fine}}{4} = \frac{c}{4n_1 N f_{r1}};$$

wherein $U(L_{coarse})$ represents a coarse measurement uncertainty, and $\lambda_{fine}$ represents a fine measurement scale;

selecting, in response to the secondary mixing coarse measurement signals and $N^{th}$ order inter-mode self-interference fine measurement signals of a first optical frequency comb not satisfying the inter-stage transition condition, a $P^{th}$ order inter-mode self-interference signal of the first optical frequency comb and a $Q^{th}$ order inter-mode self-interference signal of the second optical frequency comb, and taking an inter-mode self-interference secondary mixing signal with a frequency of $|Pf_{r1}-Qf_{r2}|$ as an intermediate transition measurement scale to satisfy an inter-stage transition condition of a coarse measurement scale and the intermediate transition measurement scale; wherein a formula of the inter-stage transition condition of the coarse measurement scale and the intermediate transition measurement scale is expressed as follows:

$$U(L_{coarse}) < \frac{\lambda_{middle}}{4} = \frac{c}{4n|Pf_{r1} - Qf_{r2}|} = \frac{c \cdot |Nf_{r1} - Mf_{r2}|}{4|n_1 N f_{r1} - n_2 M f_{r2}| \cdot |Pf_{r1} - Qf_{r2}|};$$

wherein $\lambda_{middle}$ represents a wavelength of the inter-mode self-interference secondary mixing signal with the frequency of $|Pf_{r1}-Qf_{r2}|$, and n represents an equivalent refractive index of the inter-mode self-interference secondary mixing signals;

performing step 2 to step 5 to measure a phase difference $\varphi_{middle0}$ between the measurement end and the reference end of the inter-mode self-interference secondary mixing signal with the frequency of $|Pf_{r1}-Qf_{r2}|$ at the zero position and a phase difference $\varphi_{middle}$ between the measurement end and the reference end of the inter-mode self-interference secondary mixing signal with the frequency of $|Pf_{r1}-Qf_{r2}|$ at the position of the to-be-measured distance L, and calculating a distance measurement result of the intermediate transition measurement scale by using a formula expressed as follows:

$$L_{middle} = \frac{\varphi_{middle} - \varphi_{middle0}}{2\pi} \cdot \frac{c \cdot |Nf_{r1} - Mf_{r2}|}{2|n_1 N f_{r1} - n_2 M f_{r2}| \cdot |Pf_{r1} - Qf_{r2}|};$$

making the intermediate transition measurement scale satisfy an inter-stage transition condition of the intermediate transition measurement scale and a fine measurement scale, wherein a formula of the inter-stage transition condition of the intermediate transition measurement scale and the fine measurement scale is expressed as follows:

$$U(L_{middle}) < \frac{\lambda_{fine}}{4} = \frac{c}{4n_1 N f_{r1}};$$

taking, by selecting the $P^{th}$ order inter-mode self-interference signal of the first optical frequency comb and the $Q^{th}$ order inter-mode self-interference signal of the second optical frequency comb, the inter-mode self-interference secondary mixing signal with the frequency of $|Pf_{r1}-Qf_{r2}|$ as the intermediate transition measurement scale to satisfy the inter-stage transition condition of the coarse measurement scale and the intermediate transition measurement scale and the inter-stage transition condition of the intermediate transition measurement scale and the fine measurement scale, to thereby achieve accuracy transmission among the coarse measurement scale, the intermediate transition measurement scale and the fine measurement scale; and step 7, calculating, by using an inter-mode self-interference secondary mixing signal with a frequency of $f_{2nd}$ as a coarse measurement scale, a corresponding coarse measurement distance $L_{coarse0}$, and calculating, by using the inter-mode self-interference secondary mixing signal with the frequency of $|Pf_{r1}-Qf_{r2}|$ as the intermediate transition measurement scale, a corresponding intermediate distance $L_{middle}$ after the intermediate transition measurement scale satisfies the inter-stage transition condition of the coarse measurement scale and the intermediate transition measurement scale and the inter-stage transition condition of the intermediate transition measurement scale and the fine measurement scale; and substituting the coarse measurement distance $L_{coarse0}$ and the intermediate distance $L_{middle}$ into the formula of step 5 to obtain a transition distance, and recording the transition distance as $L_{coarse-new}$; wherein a formula for calculating the transition distance $L_{coarse-new}$ is expressed as follows:

$$L_{coarse-new} = L_{middle} + \frac{c}{2n|Pf_{r1} - Qf_{r2}|} \cdot \text{floor}\left[\frac{2n|Pf_{r1} - Qf_{r2}|(L_{coarse0} - L_{middle})}{c} + \frac{1}{2}\right];$$

wherein $f_{2nd}$ represents a frequency difference of the inter-mode self-interference secondary mixing signals of the optical frequency combs;

calculating, by using an inter-mode self-interference signal with a frequency of $Nf_{r1}$ as a fine measurement scale, the fine measurement distance $L_{fine}$; and substituting the transition distance $L_{coarse-new}$ and the fine measurement distance $L_{fine}$ into the formula of step 5 to obtain the to-be-measured distance L; wherein a formula of the to-be-measured distance L is expressed as follows:

$$L = L_{fine} + \frac{c}{2n_1 N f_{r1}} \cdot \text{floor}\left[\frac{2n_1 N f_{r1}(L_{coarse-new} - L_{fine})}{c} + \frac{1}{2}\right].$$

2. A distance measurement device based on secondary mixing of inter-mode self-interference signals of optical frequency combs, applying the distance measurement method as claimed in claim 1, comprising: a dual-comb light source (1), a detection optical module (2) of the inter-mode self-interference signals of the optical frequency combs, and a generation, acquisition and calculation module (3) of inter-mode self-interference secondary mixing signals of the optical frequency combs;

wherein the dual-comb light source (1) is configured to emit a dual-comb laser into the detection optical module (2) to obtain the inter-mode self-interference signals of the optical frequency combs carrying to-be-measured distance information; and the detection optical module (2) is configured to output the inter-mode self-interference signals of the optical frequency combs into the generation, acquisition and calculation module (3) to generate the inter-mode self-interference secondary mixing signals, to thereby achieve data acquisition and obtain a distance measurement result;

wherein the dual-comb light source (1) comprises: a first optical frequency comb laser (4) and a second optical frequency comb laser (5); a repetition rate of the first optical frequency comb laser (4) is locked to $f_{r1}$, and the repetition rate of the second optical frequency comb laser (5) is locked to $f_{r2}$; the first optical frequency comb laser (4) and the second optical frequency comb laser (5) are configured to emit a first optical frequency comb and a second optical frequency comb, respectively; and offset frequencies of the first optical frequency comb and the second optical frequency comb are unlocked;

wherein a $N^{th}$ order inter-mode self-interference signal of the first optical frequency comb is a signal generated by beat frequency interference between paired longitudinal modes with a frequency interval of $Nf_{r1}$ in comb modes of the first optical frequency comb;

wherein an $M^{th}$ order inter-mode self-interference signal of the second optical frequency comb is a signal generated by beat frequency interference between paired longitudinal modes with a frequency interval of $Mf_{r2}$ in comb modes of the second optical frequency comb; and wherein a value of N is determined by a measurement accuracy requirement, and the higher frequency interval $Nf_{r1}$, the higher the measurement accuracy under a condition of same interference phase measurement accuracy.

3. The distance measurement device as claimed in claim 2, wherein the first optical frequency comb and the second optical frequency comb are linearly polarized light and have mutually orthogonal polarization directions.

4. The distance measurement device as claimed in claim 2, wherein the detection optical module (2) comprises: a detector (6) for the second optical frequency comb at the reference end, a detector (7) for the first optical frequency comb at the reference end, a polarizing beam splitter (8) at the reference end, a half-wave plate (9) at the reference end, a target reflector (10), a 50/50 beam splitter (11), a half-wave plate (12) at the measurement end, a polarizing beam splitter (13) at the measurement end, a detector (14) for the first optical frequency comb at the measurement end, and a detector (15) for the second optical frequency comb at the measurement end;

the first optical frequency comb and the second optical frequency comb emitted by the dual-comb light source (1) are reflected and transmitted at the 50/50 beam splitter (11) to obtain first reflected light and first transmitted light of the first optical frequency comb and first reflected light and first transmitted light of the second optical frequency comb; the first reflected light of the first optical frequency comb and the first reflected light of the second optical frequency comb are reflected and transmitted at the polarizing beam splitter (8) at the reference end after passing through the half-wave plate (9) at the reference end to obtain second reflected light of the first optical frequency comb and second transmitted light of the second optical frequency comb; and the second reflected light of the first optical frequency comb is illuminated on the detector (7) for the first optical frequency comb at the reference end, and the second transmitted light of the second optical frequency comb is illuminated on the detector (6) for the second optical frequency comb at the reference end; and the first transmitted light of the first optical frequency comb and the first transmitted light of the second optical frequency comb obtained at the 50/50 beam splitter (11) are reflected at the target reflector (10) to obtain third reflected light of the first optical frequency comb and third reflected light of the second optical frequency comb; the third reflected light of the first optical frequency comb and the third reflected light of the second optical frequency comb return to the 50/50 beam splitter (11) to be reflected and transmitted to obtain fourth reflected light of the first optical frequency comb and fourth reflected light of the second optical frequency comb; the fourth reflected light of the first optical frequency comb and the fourth reflected light of the second optical frequency comb are reflected and transmitted at the polarizing beam splitter (13) at the measurement end after passing through the half-wave plate (12) at the measurement end to obtain fifth reflected light of the first optical frequency comb and third transmitted light of the second optical frequency comb; and the fifth reflected light of the first optical frequency comb is illuminated on the detector (14) for the first optical frequency comb at the measurement end, and the third transmitted light of the second optical frequency comb is illuminated on the detector (15) for the second optical frequency comb at the measurement end.

5. The distance measurement device as claimed in claim 4, wherein the inter-mode self-interference signals of the optical frequency combs comprise:

$N^{th}$ order inter-mode self-interference signals of the first optical frequency comb generated at the detector (7) for the first optical frequency comb at the reference end and the detector (14) for the first optical frequency comb at the measurement end; and $M^{th}$ order inter-mode self-interference signals of the second optical frequency comb generated at the detector (6) for the second optical frequency comb at the reference end and the detector (15) for the second optical frequency comb at the measurement end.

6. The distance measurement device as claimed in claim 5, wherein the generation, acquisition and calculation module (3) comprises: the coarse measurement signal generating mixer (16) at the reference end, the fine measurement signal generating mixer (17) at the reference end, the local oscillator (18), the fine measurement signal generating mixer (19) at the measurement end, the coarse measurement signal generating mixer (20) at the measurement end, the data acquisition card (21) and the upper computer (22);

the $N^{th}$ order inter-mode self-interference signal of the first optical frequency comb generated at the detector (7) for the first optical frequency comb at the reference end is divided into two paths; the coarse measurement signal generating mixer (16) at the reference end is configured to perform secondary mixing on one of the two paths of the $N^{th}$ order inter-mode self-interference signal at the reference end and the $M^{th}$ order inter-mode self-interference signal of the second optical frequency comb generated at the detector (6) for the second optical frequency comb at the reference end, to generate a secondary mixing coarse measurement signal with a longest measurement scale at the reference end; and the fine measurement signal generating mixer (17) at the reference end is configured to perform mixing on the other path of the $N^{th}$ order inter-mode self-interference signal at the reference end and a local oscillator signal emitted by the local oscillator (18), to thereby demodulate distance fine measurement information at the reference end to a low frequency band to obtain a mixing fine measurement signal at the reference end;

the $N^{th}$ order inter-mode self-interference signal of the first optical frequency comb generated at the detector (14) for the first optical frequency comb at the measurement end is divided into two paths; the coarse measurement signal generating mixer (20) at the measurement end is configured to perform secondary mixing on one of the two paths of the $N^{th}$ order inter-mode self-interference signal at the measurement end and the $M^{th}$ order inter-mode self-interference signal of the second optical frequency comb generated at the detector (15) for the second optical frequency comb at the measurement end, to generate a secondary mixing coarse measurement signal with the longest measurement scale at the measurement end; and the fine measurement signal generating mixer (19) at the measurement end is configured to perform mixing on the other path of the $N^{th}$ order inter-mode self-interference signal at the measurement end and the local oscillator signal emitted by the local oscillator (18), to thereby demodulate distance fine measurement information at the measurement end to the low frequency band to obtain a mixing fine measurement signal at the measurement end; and the secondary mixing coarse measurement signal with the longest measurement scale at the reference end, the mixing fine measurement signal at the reference end, the secondary mixing coarse measurement signal with the longest measurement scale at the measurement end, and the mixing fine measurement signal at the measurement end are transmitted to different acquisition channels of the data acquisition card (21), and then are transmitted to the upper computer (22) to be calculated.

7. The distance measurement device as claimed in claim 6, wherein the inter-mode self-interference secondary mixing signal of the optical frequency combs is a signal generated by secondary mixing between the $N^{th}$ order inter-mode self-interference signal of the first optical frequency comb and the $M^{th}$ order inter-mode self-interference signal of the second optical frequency comb; a frequency $f_{2nd}$ of the inter-mode self-interference secondary mixing signals is a frequency difference of the inter-mode self-interference signals, and the frequency $f_{2nd}$ is expressed as $f_{2nd}=|Nf_{r1}-Mf_{r2}|$, and the measurement unambiguous range of phase corresponding to the frequency $f_{2nd}$ is expressed as $$L_{NAR} = \frac{c}{2nf_{2nd}},$$

wherein c represents a speed of light in vacuum, n represents an equivalent refractive index of the inter-mode self-interference secondary mixing signals, and a value of n is $$n = \frac{|n_1 N f_{r1} - n_2 M f_{r2}|}{f_{2nd}},$$

wherein $n_1$ represents a group refractive index of the first optical frequency comb, and $n_2$ represents a group refractive index of the second optical frequency comb; and the inter-mode self-interference secondary mixing signals are configured for coarse distance measurement, and the frequency $f_{2nd}$ satisfies the inter-stage transition condition; and a value of a positive integer M is determined by the measurement unambiguous range and the frequency interval $Nf_{r1}$, and the lower the frequency $f_{2nd}$, the larger the measurement unambiguous range.

* * * * *